US007758831B2

(12) United States Patent
Abrams et al.

(10) Patent No.: US 7,758,831 B2
(45) Date of Patent: Jul. 20, 2010

(54) SYSTEMS AND METHODS FOR REMOVING MATERIALS FROM FLUE GAS VIA REGENERATIVE SELECTIVE CATALYTIC REDUCTION

(75) Inventors: Richard F. Abrams, Westborough, MA (US); John Robert Harold, Worcester, MA (US)

(73) Assignee: Babcock Power Environmental Inc., Worcester, MA (US)

( * ) Notice: Subject to any disclaimer, the term of this patent is extended or adjusted under 35 U.S.C. 154(b) by 0 days.

(21) Appl. No.: 12/355,231

(22) Filed: Jan. 16, 2009

(65) Prior Publication Data
US 2009/0130011 A1 May 21, 2009

Related U.S. Application Data

(63) Continuation-in-part of application No. 11/938,665, filed on Nov. 12, 2007, now Pat. No. 7,494,625, which is a continuation of application No. 10/957,499, filed on Sep. 30, 2004, now Pat. No. 7,294,321.

(60) Provisional application No. 61/056,310, filed on May 27, 2008.

(51) Int. Cl.
*B01D 53/34* (2006.01)
*B01D 53/62* (2006.01)
*F23L 15/02* (2006.01)
(52) U.S. Cl. ............... 423/210; 423/239.1; 423/247; 422/173; 422/175; 165/4
(58) Field of Classification Search ............ 423/210, 423/239.1, 247; 422/129, 169, 170, 171, 422/173, 175; 165/4
See application file for complete search history.

(56) References Cited

U.S. PATENT DOCUMENTS

| 4,447,333 | A | | 5/1984 | Wagener et al. |
| 4,735,785 | A | | 4/1988 | Eichholtz et al. |
| 4,770,857 | A | | 9/1988 | Ludwig |
| 4,877,592 | A | * | 10/1989 | Matros et al. ............ 423/245.1 |
| 5,364,259 | A | | 11/1994 | Matros et al. |
| 5,651,668 | A | | 7/1997 | Schmid |
| 5,658,541 | A | | 8/1997 | Matros et al. |

(Continued)

FOREIGN PATENT DOCUMENTS

DE        4027329        3/1992

(Continued)

OTHER PUBLICATIONS

European Search Report for EP05020884, dated Dec. 19, 2005.

(Continued)

*Primary Examiner*—Timothy C Vanoy
(74) *Attorney, Agent, or Firm*—Edwards Angell Palmer & Dodge LLP

(57) ABSTRACT

Regenerative selective catalytic reduction (RSCR) systems and processes are provided whereby $NO_x$ and CO levels in gases are reduced by mixing the gas with a reactant and then introducing the gas into an RSCR apparatus for treatment that entails heating the gas, causing the gas to undergo one or more catalytic reactions, and then directing the gas through a heat transfer area, to which the gas provides heat for use in connection with successive cycles of the RSCR process.

21 Claims, 8 Drawing Sheets

U.S. PATENT DOCUMENTS

| | | |
|---|---|---|
| 5,891,411 A | 4/1999 | Gribbon |
| 5,919,425 A * | 7/1999 | Nguyen et al. ............... 423/210 |
| 6,039,927 A | 3/2000 | Greco |
| 6,183,707 B1 | 2/2001 | Gosselin et al. |
| 6,228,329 B1 | 5/2001 | Garvey |
| 6,673,325 B2 | 1/2004 | Gravel |
| 7,017,592 B2 | 3/2006 | Chiles et al. |
| 7,294,321 B2 * | 11/2007 | Abrams ....................... 423/210 |
| 7,494,625 B2 * | 2/2009 | Abrams ....................... 422/129 |
| 2005/0118084 A1 | 6/2005 | Cichanowicz |
| 2005/0129601 A1 | 6/2005 | Li et al. |
| 2005/0232838 A1 | 10/2005 | Cichanowicz |
| 2008/0050297 A1 | 2/2008 | Harold et al. |
| 2008/0317652 A1 | 12/2008 | Bono et al. |

FOREIGN PATENT DOCUMENTS

| | | |
|---|---|---|
| EP | 487886 | 6/1992 |
| JP | 63072327 | 4/1988 |

OTHER PUBLICATIONS

PCT Search Report with Written Opinion, dated Sep. 23, 2009 for PCT/US2009/045107.

* cited by examiner

SYSTEMS AND METHODS FOR REMOVING MATERIALS FROM FLUE GAS VIA REGENERATIVE SELECTIVE CATALYTIC REDUCTION

CROSS-REFERENCE TO RELATED APPLICATIONS

This application claims benefit of priority from U.S. Provisional Application Ser. No. 61/056,310, filed May 27, 2008, and is a continuation in part of U.S. application Ser. No. 11/938,665 filed Nov. 12, 2007, now U.S. Pat. No. 7,494,625, which is a continuation of U.S. application Ser. No. 10/957,499, filed Sep. 30, 2004, now U.S. Pat. No. 7,294,321, each of which is incorporated by reference herein in its entirety.

FIELD OF THE INVENTION

The present invention relates to systems and methods for removing materials from flue gas, and, more particularly, to systems and methods for flue gas denitrification (i.e., for removing nitrogen oxides from flue gas) via regenerative selective catalytic reduction (RSCR).

BACKGROUND OF THE INVENTION

High-temperature combustion processes and other like technologies serve vital roles in industry; however, often an unfortunate by-product of such processes is the generation and release into the atmosphere of contaminants within outputted flue gas. Among the most notorious of these contaminants are nitrogen oxides (hereinafter referred to as "$NO_x$"), which are classified as pollutants by the EPA, and the output of which has been linked to the generation of smog and so-called acid rain. Thus, it is a common goal of those in industry to reduce to acceptable levels the amount of contaminants such as $NO_x$ within outputted flue gas.

For years, a commonly employed technique for reducing $NO_x$ emissions was to modify the combustion process itself, e.g., by flue gas recirculation. However, in view of the generally poor proven results of such techniques (i.e., $NO_x$ removal efficiencies of 50% or less), recent attention has focused instead upon various flue gas denitrification processes (i.e., processes for removing nitrogen from flue gas prior to the flue gas being released into the atmosphere).

Flue gas denitrification processes are categorized into so-called "wet" methods, which utilize absorption techniques, and "dry" methods, which instead rely upon adsorption techniques, catalytic decomposition and/or catalytic reduction. At present, a widely implemented denitrification process is selective catalytic reduction (SCR), which is a "dry" denitrification method whereby the introduction of a reactant (e.g., $NH_3$) causes reduction of the $NO_x$, which, in turn, becomes transformed into harmless reaction products, e.g., Nitrogen and water. The reduction process in an SCR process is typified by the following chemical reactions:

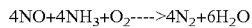

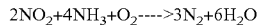

Due to the technology involved in SCR, there is some flexibility in deciding where to physically site the equipment for carrying out the SCR process. In other words, the chemical reactions of the SCR process need not occur at a particular stage or locus within the overall combustion system. The two most common placement sites are within the midst of the overall system (i.e., on the "hot side"), or at the so-called "tail end" of the overall system (i.e., on the "cold side").

Unfortunately, significant problems are encountered in industrial settings with respect to both hot side and cold side SCR installations. For example, hot side SCR processes are not optimal for use in conjunction with wood-fired burners. This is because ash present within the wood contains alkalis, which can cause damage to the catalyst due to the unidirectional gas flow during the SCR process. Cold side SCR processes avoid this disadvantage, but are plagued by thermal inefficiency due to their reliance on indirect heat exchangers.

Thus, a need exists for a selective catalytic reduction process that can be easily implemented into existing industrial operations, and that allows effective removal of $NO_x$ from flue gas while achieving high thermal efficiency and minimizing significant installation- and/or operation-related costs.

SUMMARY OF THE INVENTION

The present invention meets this and other needs by providing systems and methods for removing materials from flue gas via regenerative selective catalytic reduction (RSCR). Such systems and methods advantageously enable high removal efficiencies, yet they neither necessitate costly design changes to implement nor encounter unacceptable thermal inefficiencies when carried out.

The RSCR process of the present invention is centered around an RSCR apparatus, which can be sited on the "hot side" or "cold side" (i.e., tail end) of larger scale equipment that generates contaminants, such as $NO_x$. The RSCR apparatus includes a plurality of chambers, each of which generally contains one or more heat transfer areas and one or more catalyst areas. The RSCR apparatus also includes areas of empty space (e.g., headspace areas) within which the gas flows to and from the heat transfer areas and catalyst areas.

The purposes of each heat transfer area is to provide heat to an incoming gas and to extract heat from an outgoing gas. The purpose the catalyst area(s) is to trigger catalytic reduction whereby the $NO_x$ within the $NO_x$-containing gas is converted to harmless constituents.

The RSCR process entails a plurality or multiplicity of treatment cycles, during each of which $NO_x$-containing gas is introduced into the apparatus, treated to remove the $NO_x$, and released into the atmosphere. Prior to being introduced into the treatment apparatus, the gas to be treated is mixed with at least one reactant (e.g., ammonia) that is not already present within the gas.

Each cycle commences by introducing contaminated gas into the RSCR apparatus. In order to ensure that the temperature of the gas is high enough for catalysis to occur, heat is transferred to the gas by a heat transfer area. According to each cycle of the invention, the heat transfer area will have been pre-heated or possess residual heat and will transfer at least some of its heat to the gas.

The heated gas proceeds to the catalyst area within the same chamber as the heat transfer area, and then catalysis occurs. The gas then departs that chamber and enters another chamber at which the flow direction of the gas is changed. Preferably, the gas is heated by a one or more heat producing devices (e.g., one or more burners) before it reaches this other chamber. There, the gas undergoes further catalysis and then encounters another heat transfer area, to which the gas bestows heat due to it having a higher temperature than the heat transfer area. The residual heat in this heat transfer area can, in turn, provide heat to additional $NO_x$-containing gas that is introduced into the apparatus for treatment in accordance with a second cycle of the RSCR process of the present invention.

Thus, each cycle of the RSCR process not only rids gas of $NO_x$, but it also provides heat to facilitate performance of subsequent cycles of the process. This enables the RSCR process to continue in an ongoing manner.

The RSCR process of the present invention enjoys several important advantages as compared to conventional selective catalytic reduction (SCR) processes. For example, each cycle of the process entails multidirectional gas flow through the catalyst. Accordingly, the present invention allows for levels of heat transfer and heat recovery that are unheard of for conventional "cold side" SCR processes, which must rely upon indirect heating equipment to effect suitable levels of heat transfer. Moreover, levels of ammonia slip are not excessively high in accordance with the RSCR process of the present invention despite the fact that the gas being treated moves in different directions through multiple catalyst areas. This is highly unexpected. Without wishing to be bound by theory, the inventor of the present invention believes that at least part of the reason why there is no excessive ammonia slip is because the ammonia absorbed onto the catalyst desorbs less effectively than anticipated.

It is also contemplated that the RSCR apparatus can include means for reducing CO in the mixed flue gases. The RSCR process can include causing a mixture of flue gases to encounter means for reducing CO in the mixed gas.

In another embodiment, a regenerative selective catalytic process includes the steps of causing a predetermined concentration of at least one reactant to be mixed with a predetermined quantity of a contaminant-containing gas to form a mixed gas and introducing the mixed gas into a treatment apparatus. The mixed gas is treated within the treatment apparatus to reduce the concentration of contaminant in the mixed gas, wherein the treatment apparatus includes first and second heat transfer areas and first and second catalyst areas. The treatment entails: (i) causing the mixed gas to accept heat from at the first heat transfer areas and to provide heat to the second heat transfer area, (ii) causing the mixed gas to encounter the first catalyst area and the second catalyst area, wherein the mixed gas undergoes catalytic reduction at each of the catalyst areas, and (v) causing the mixed gas to flow in at least a first direction and a second direction within the apparatus during such treatment, the first direction being different from the second direction. The mixed gas is caused to be expelled from the apparatus by activating a gas movement influencing device that is in communication with at least one of the heat transfer areas of the apparatus.

Various other aspects and embodiments of the present invention are discussed below.

BRIEF DESCRIPTION OF THE DRAWINGS

For a fuller understanding of the nature and desired objects of the present invention, reference is made to the following detailed description, which is to be taken in conjunction with the accompanying drawing figures wherein like reference characters denote corresponding parts throughout the several views presented within the drawing figures, and wherein.

DETAILED DESCRIPTION OF THE INVENTION

Figure 1:
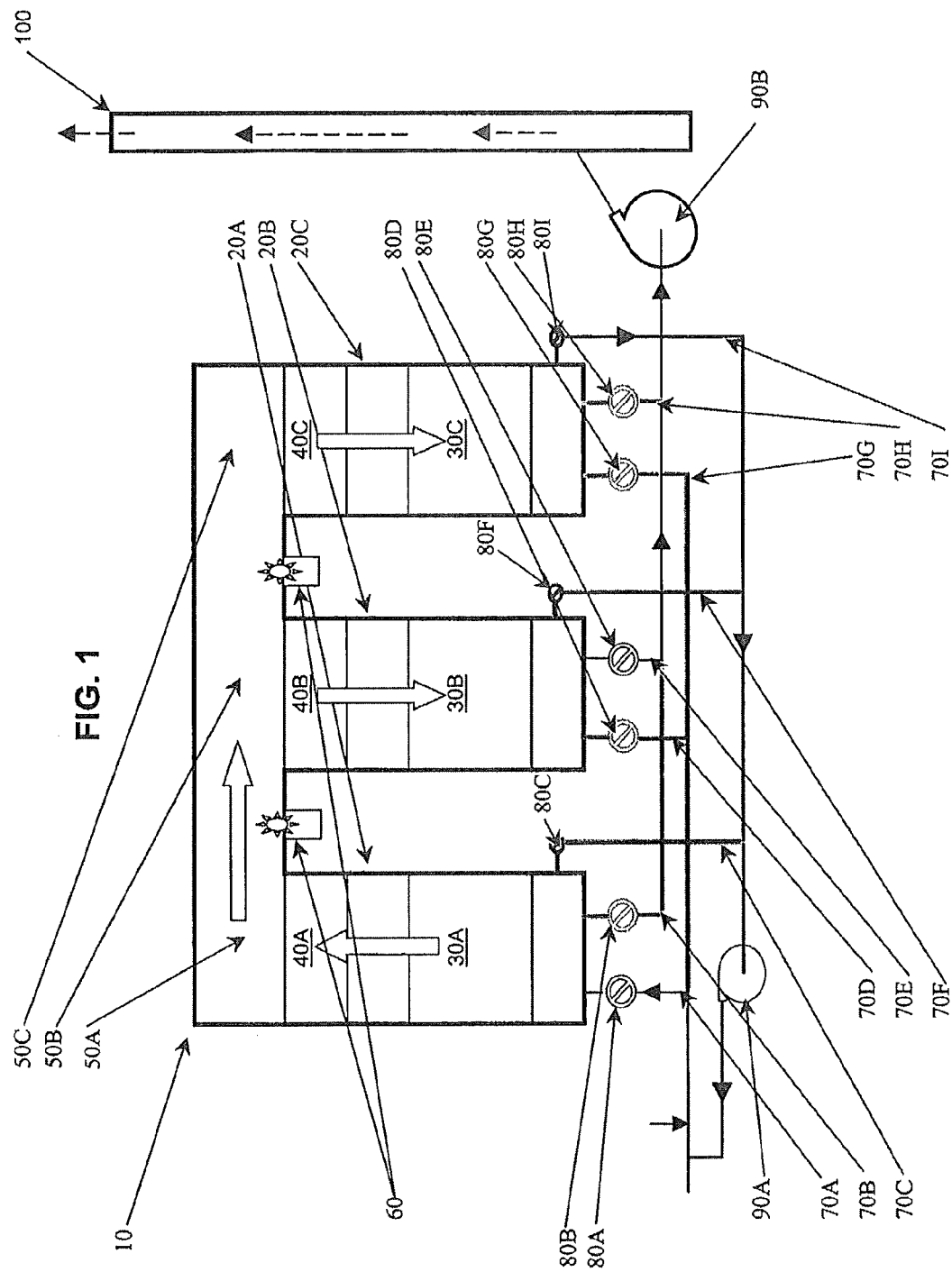
FIG. 1 is a schematic view of a regenerative selective catalytic reduction (RSCR) apparatus during a first cycle of an RSCR process in accordance with an exemplary embodiment of the present invention.
Figure 2:
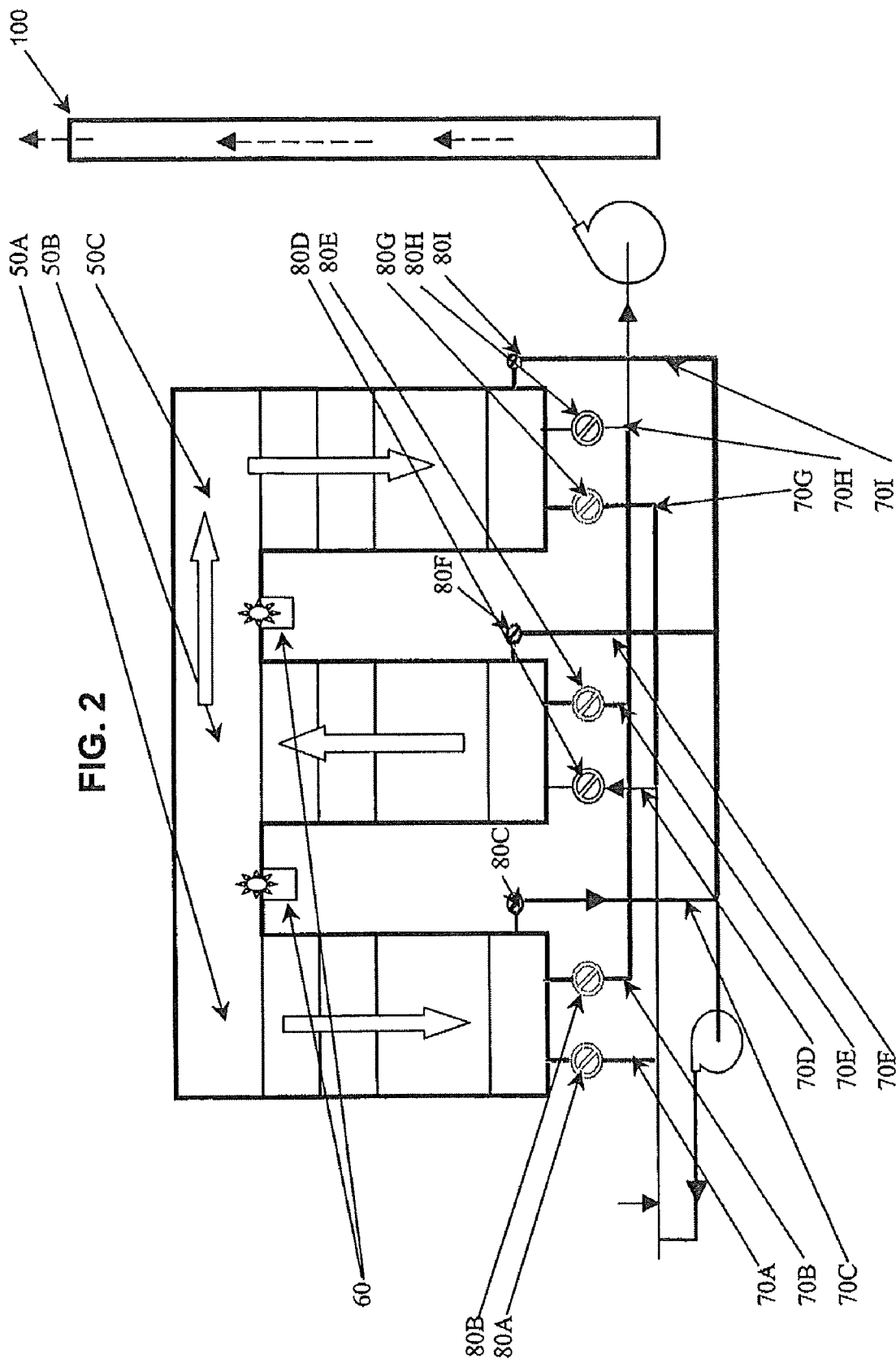
FIG. 2 is a schematic view of the RSCR apparatus of FIG. 1 during a second cycle of an RSCR process in accordance with an exemplary embodiment of the present invention.
Figure 3:
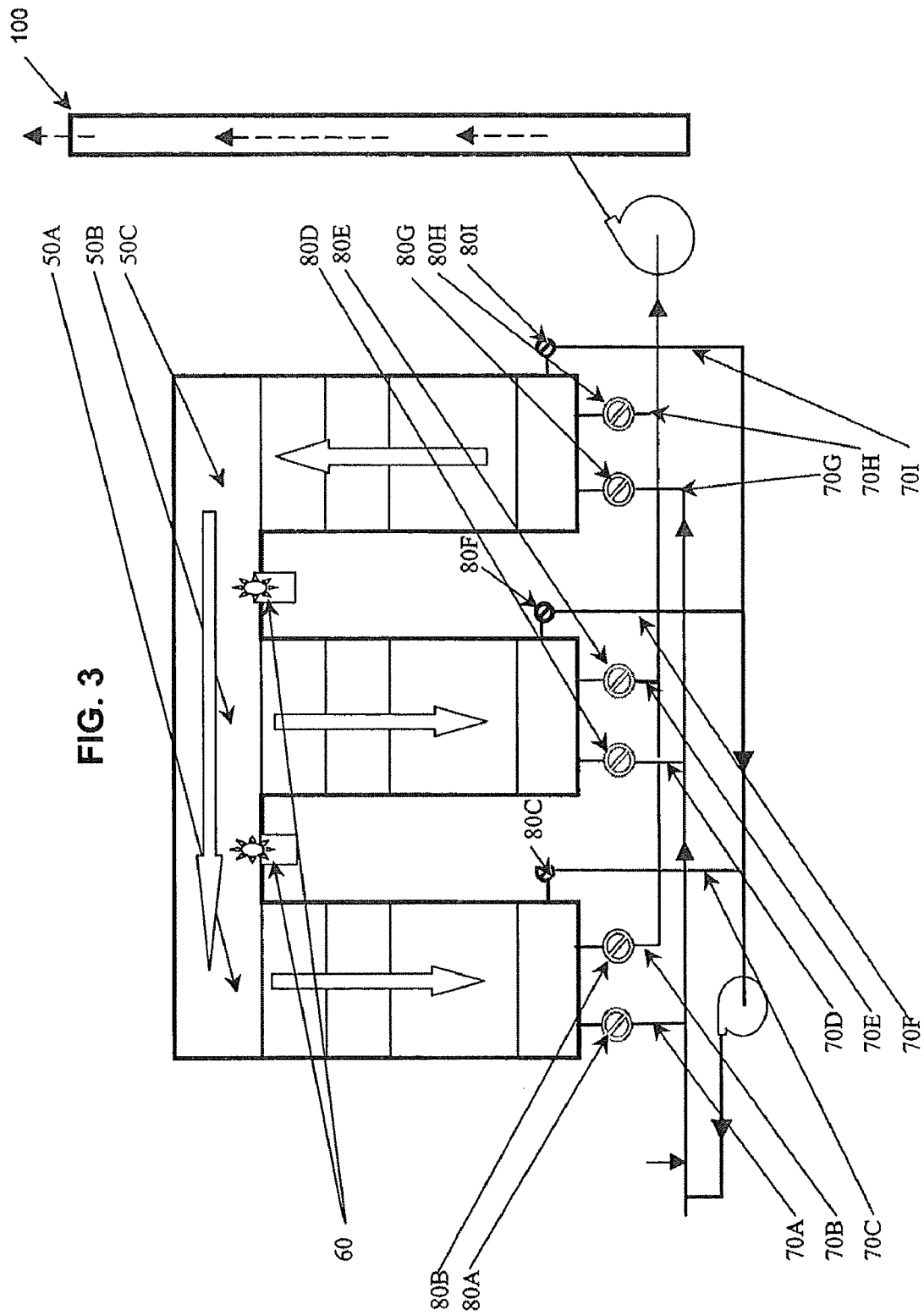
FIG. 3 is a schematic view of the RSCR apparatus of FIGS. 1 and 2 during a third cycle of an RSCR process in accordance with an exemplary embodiment of the present invention.

FIGS. 1-3 depict a regenerative selective catalytic reduction (RSCR) apparatus 10. The RSCR apparatus 10 is sited within other industrial equipment (not shown) that outputs airborne materials (e.g., flue gas) into the environment. Examples of such industrial equipment include, but are not limited to, high-temperature combustion equipment and power plant equipment. The specific location of the apparatus 10 within such industrial equipment can vary; however, according to a currently preferred embodiment of the present invention, the RSCR apparatus is located at the so-called "tail end" (i.e., "cold side") of the industrial equipment. Other exemplary locations for the RSCR apparatus include, but are not limited to so-called "hot side" locations, e.g. "hot side, low dust."

The RSCR apparatus 10 includes a plurality of chambers (also known as canisters, housings, units or segments) 20 into and out of which contaminant-containing (e.g., $NO_x$-containing) gas flows to be heated or to dissipate heat, and to undergo catalytic reduction as will be described in detail below. The number of chambers 20 within the RSCR apparatus 10 can vary, with the specific number being based on several factors, including but not limited to the size of the RSCR apparatus 10, the dimensions of the equipment in which the RSCR apparatus is sited, the concentration of the contaminant within the contaminant-containing gas, the choice of catalyst, and/or the choice of reactant.

According to an exemplary embodiment of the present invention, the number of chambers 20 can be in the range of two to nine, both encompassing. It is currently preferred for the number of chambers 20 to be less than or equal to seven. As is currently most preferred, and as is depicted in FIGS. 1-3, the RSCR apparatus includes three chambers 20—a first chamber 20A, a second chamber 20B and a third chamber 20C.

Each chamber 20 can include one or more heat transfer areas 30 and/or one or more catalyst areas 40. Generally, but not necessarily, the total number of heat transfer areas 30 in the apparatus 10 is equal to the total number of catalyst areas 40 in the apparatus. In an embodiment wherein the total number of heat transfer areas 30 in the apparatus 10 differs from the total number of catalyst areas 40 in the apparatus, it is currently preferred that the total number of heat transfer areas be greater than the total number of catalyst areas.

Each chamber 20 also includes areas of empty space, including one or more headspace areas 50, which are defined as areas into which gas can flow freely from one chamber to another. As shown in the embodiment depicted in FIGS. 1-3, first chamber 20A includes a first headspace area 50A, second chamber 20B includes a second headspace area 50B, and third chamber 20C includes a third headspace area 50C. There can be other areas of empty space as well, such as above and/or below any or all of the heat transfer areas 30, and above and/or below any or all the catalyst areas 40.

According to a currently preferred embodiment of the present invention, no heat transfer areas 30 and no catalyst areas 30 are located within the headspace areas 50. However, one or more other devices or apparatus can be located in one or more of the headspace areas 50. For example, and as is shown in FIGS. 1-3, one or more heat producing devices 60 can be located in one or more of the headspace areas 50. The heat producing devices 60 can be any of those known in the art, e.g., one or more burners.

It is currently preferred to locate one or more burners 60 within the headspace area(s) 50, especially in an embodiment of the present invention in which the reactant is ammonia. This is because such an arrangement minimizes the risk of undesirably oxidizing ammonia to form additional $NO_x$-containing gas.

The number of burners 60 located within the headspace areas 50 can vary according to several factors (e.g., the need/degree to alter the temperature of the gas entering or leaving the chambers 20); however, the total number of burners 60 in the headspace areas 50 generally will be less than or equal to the total number of chambers. It should be noted that one or more burners 60 can be located in other areas of the RSCR apparatus 10 in addition to or in lieu of the headspace areas 50, with such other areas including but not limited to the area between a heat transfer area 30 and a catalyst area 40, or the area below a heat transfer area.

The heat transfer areas 30 serve one of two functions, with the specific function depending on both the particular cycle/stage of the RSCR process that is occurring, and the particular chamber 20 within which they are located. For example, and as will be described below, the same heat transfer area 30 can provide/transfer heat to an incoming gas, or can extract/transfer heat from an outgoing gas.

According to a currently preferred embodiment of the present invention, and as shown in FIGS. 1-3, each chamber 20 includes one heat transfer area 30 such that the first chamber 20A includes a first heat transfer area 30A, the second chamber 20B includes a second heat transfer area 30B, and the third chamber 20C includes a third heat transfer area 30C.

The heat transfer areas 30 should be constructed of one or more materials that have a high heat capacity, are capable of both absorbing and releasing heat efficiently, and that allow gas to flow therethrough—that is, each heat transfer area 30 should be constructed of one or more materials that (a) can accept heat from a gas that flows through the heat transfer area if the gas has a higher temperature than the heat transfer area, but also that (b) can provide heat to a gas that flows through the heat transfer area if the heat transfer area has a lower temperature than the gas.

Exemplary materials from which the heat transfer areas 30 can be made include, but are not limited to ceramic media such as silica, alumina or mixtures thereof, with a currently preferred material being high silica structured media. It should be noted that some or all of the heat transfers areas 30 can, but need not be constructed of the same materials—that is, some but not all of the heat transfer areas can be made of the same combination of materials, or each of the heat transfer areas can be made of a different combination of materials.

Any or all of the heat transfer areas 30 can have a substantially uniform temperature (e.g., where the inlet, outlet and middle areas of a heat transfer area have substantially the same temperature) or a non-uniform temperature (e.g., wherein one or more of the inlet, outlet and/or middle areas of a heat transfer area have different temperatures). In an embodiment wherein a heat transfer area 30 has a non-uniform temperature, it is currently preferred that the inlet of the heat transfer area (i.e., where the gas enters) have a higher temperature than the outlet of the heat transfer area (i.e., where the gas exits).

The RSCR apparatus 10 also includes one or more catalyst areas 40, which, like the one or more heat transfer areas 30, are located within one or more of the chambers 20. The purpose of the catalyst areas 40 is to lower the temperature(s) necessary for the reduction reaction(s) to occur. That causes the reduction process to require less energy and, in turn, renders the RSCR process more economical.

When the gas enters (i.e., flows through) each catalyst area 40, catalytic reduction occurs whereby the $NO_x$ within the $NO_x$-containing gas is converted to harmless constituents in accordance with the following exemplary reactions, wherein it is noted that other reactions may occur in lieu of or in addition to these:

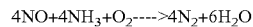

$4NO+4NH_3+O_2 \longrightarrow 4N_2+6H_2O$

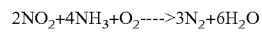

$2NO_2+4NH_3+O_2 \longrightarrow 3N_2+6H_2O$

Certain side reactions also may occur during the catalysis process, such as:

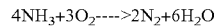

$4NH_3+3O_2 \longrightarrow 2N_2+6H_2O$

$4NH_3+5O_2 \longrightarrow 4NO+6H_2O$

The number of catalyst areas 40 can vary; however, according to a currently preferred embodiment of the present invention, and as shown in FIGS. 1-3, each chamber 20 includes one catalyst area 40 such that the first chamber 20A includes a first catalyst area 40A, the second chamber 20B includes a second catalyst area 40B, and the third chamber 20C includes a third catalyst area 40C.

The catalyst areas 40 may be made of a variety of materials and can assume a variety of shapes and configurations. It should be noted that the catalyst areas 40 can, but need not be constructed of the same materials—that is, some but not all of the catalyst areas can be made of the same combination of materials, or each of the catalyst areas can be made of a different combination of materials.

According to a currently preferred embodiment of the present invention, each catalyst area 40 is made of ceramic material and has either a honeycomb or plate shape. The ceramic material generally is a mixture of one or more carrier materials (e.g., titanium oxide) and active components (e.g., oxides of vanadium and/or tungsten).

Generally, the choice of shape of the catalyst areas 40 will influence other aspects of their construction/formation. For example, when a catalyst area 40 is honeycomb shaped, it can be formed, by way of non-limiting example, of extruded ceramic with the catalyst either homogenously incorporated throughout the structure or coated on the substrate. When a catalyst area 40 assumes a plate geometry, the support material generally is coated with the catalyst material(s).

The catalyst areas 40 also can take in the shape of one or more beds/layers, with the number of beds generally ranging from two to four, both encompassing.

The placement of catalyst areas 40 vis-à-vis heat transfer areas 30 can vary as well. According to a currently preferred embodiment of the present invention, and as shown in FIGS. 1-3, the RSCR apparatus 10 is designed such that $NO_x$-containing gas that enters a chamber 20 first encounters a predetermined heat transfer area 30, and, after flowing through that heat transfer area, encounters the catalyst area 40 located within the same chamber as the heat transfer area.

It should be noted that although FIGS. 1-3 depict the first, second and third heat transfer areas 30A, 30B, 30C as being substantially aligned with each other and further depict the first, second and third catalyst areas 40A, 40B, 40C as being substantially aligned with each other as well, and although either or both such arrangements can occur, neither is a requirement of the present invention. In other words, the heat transfers areas 30 are not required to be aligned with each other, and the catalyst areas 30 are not required to be aligned with each other.

The apparatus 10 enables regenerative selective catalytic reduction (RSCR) to occur, as shown in FIGS. 1-3, wherein FIG. 1 depicts a first cycle of the process, FIG. 2 depicts a second cycle, and FIG. 3 depicts a third cycle. The number of cycles that constitute a complete RSCR process can vary in accordance with the present invention, as can the definition of what specifically constitutes a cycle.

A cycle of the RSCR process is generally defined as the time it takes for a predetermined amount/volume of $NO_x$-containing gas to enter the apparatus 10, undergo selective catalytic reduction therein, and be evacuated from the apparatus. The number of cycles can be predetermined, and, if so, can range from tens of cycles to thousands of cycles. Also, due to the design of the apparatus 10, the RSCR process can be substantially ongoing/continuous, whereby there is no fixed number of cycles.

Prior to the commencement of the first cycle of the RSCR process, the heat transfer area 30 with which the $NO_x$-containing gas will first come into contact should be pre-heated to a predetermined temperature. This predetermined temperature is selected such that the $NO_x$-containing gas, once it has passed through that preselected heat transfer area, will be within a temperature range that allows for the $NO_x$-containing gas to undergo catalytic reaction upon encountering the catalyst area within the same chamber 20. In other words, if the $NO_x$-containing gas will first encounter the first heat transfer area 30A, then the first heat transfer area should be pre-heated to a temperature whereby the gas, once it has passed through the first heat transfer area, is at a temperature that will allow for catalytic reduction to occur when the gas reaches the first catalyst area 40A.

In order for catalytic reaction to occur at a catalyst area 40, and according to an exemplary embodiment of the present invention, the $NO_x$-containing gas should be in the range of about 450° F. to about 800° F. upon entering the catalyst area. Thus, the heat transfer area 30 with which the gas will first come into contact should be heated to a predetermined temperature in the range of about 450° F. to about 800° F., wherein about 625° F. is a currently preferred temperature.

Various techniques for pre-heating the heat transfer area 30 with which the gas will first come into contact (i.e., the designated heat transfer area) are known to those of ordinary skill in the art. By way of non-limiting example, the temperature of ambient air within the apparatus 10 can be raised by activating one, some or all of the burner(s) 60 located within the apparatus. Alternatively, natural gas can be introduced into the apparatus 10 to be heated by one, some or all of the burner(s) 60. One or more temperature gauges (not shown) or other temperature assessment devices can be placed within or in communication with the designated heat transfer area 30 to determine whether the heated air/gas has successfully raised the temperature of the designated heat transfer area 30 to the threshold temperature.

A predetermined quantity of one or more reactants should be mixed with the $NO_x$-containing gas destined for the apparatus 10 in order to form a mixed gas and reactant. The choice of reactant(s) may vary, provided that the specific reactant(s) allow for the desired catalytic reaction to occur at the catalyst area 30.

Generally, a predetermined quantity of gas that does not contain a reactant is introduced into the apparatus 10 prior to the introduction of mixed gas and reactant, wherein the amount of gas that does not contain reactant and/or the duration of time that such non-mixed gas is introduced into the apparatus 10 can vary.

According to a currently preferred embodiment of the present invention, one reactant is added/introduced to the $NO_x$-containing gas, and that reactant is ammonia (i.e., $NH_3$). Other suitable reactants include, but are not limited to, methane and propane.

The amount/concentration of reactant added to the $NO_x$-containing gas can vary according to several factors, such as the expected concentration of $NO_x$ within the gas prior to its entry into the apparatus 10. In accordance with an exemplary RSCR process of the present invention, the concentration of ammonia introduced to the $NO_x$-containing gas is in the range of about 100 parts per million (ppm) to about 300 ppm, with 200 ppm being a currently preferred concentration.

The reactant(s) can be mixed with or otherwise placed into contact with the $NO_x$-containing gas as is generally known in the art. By way of non-limiting example, a plurality of mixing elements, e.g., static mixers (not shown), can be situated in proximity to a reactant source (not shown) and a gas source (not shown). In operation, the mixing elements cause the $NO_x$-containing gas from the gas source and the reactant from the reactant source to be mixed together as is generally known in the art and such that the gas and reactant, once suitably mixed, possess a substantially uniform temperature and concentration.

Immediately after being mixed, the temperature of the mixed gas and reactant is generally in the range of about 200° F. to about 400° F., with a temperature in the range of about 300° F. to about 350° F. being currently preferred and a temperature of about 325° F. being currently most preferred. The concentration of the mixed gas and reactant at that time is generally in the range of about 540 ppm to about 270 ppm, with a concentration of about 416 ppm to about 360 ppm being currently preferred.

Once the destined heat transfer area 30 has been pre-heated to a suitable temperature and the reactant(s) has/have been mixed with the $NO_x$-containing gas, the mixed gas and reactant(s) can be introduced into the RSCR apparatus for commencement of the first cycle of the RSCR process.

First Cycle of RSCR Process (FIG. 1)

As shown in FIG. 1, and in accordance with a first cycle of the RSCR process of the present invention, the $NO_x$-containing mixed gas and reactant is introduced into the first chamber 20A of the apparatus 10 via a conduit or other like transport medium 70A. The mixed gas and reactant enter the first chamber 20A after having passed through a first damper/valve 80A.

It should be noted that the $NO_x$-containing mixed gas and reactant need not be introduced into the first chamber 20A in accordance with the first cycle of the RSCR process—that is, the mixed gas and reactant could be introduced into the second chamber 20B or the third chamber 20C instead. However, regardless of which chamber 20 first receives the mixed gas and chamber, the heat transfer area 30 within that chamber should have been pre-heated as explained above.

Generally, and as depicted in FIGS. 1-3, one or more conduits 70 are in communication with each chamber 20 of the RSCR apparatus. Any, or, as is currently preferred, all of these conduits pass through a valve/damper 80 prior to entering the chamber 20. Thus, the first chamber 20A is in communication with first conduit 70A, second conduit 70B, and third conduit 70C, which pass through, respectively, first damper 80A, second damper 80B, and third damper 80C. The second chamber 20B is in communication with fourth conduit 70D, fifth conduit 70E, and sixth conduit 70F, which pass through, respectively, fourth damper 80D, fifth damper 80E, and sixth damper 80F. And the third chamber 20C is in communication with seventh conduit 70G, eighth conduit 70H, and ninth conduit 70I, which pass through, respectively, seventh damper 80G, eighth damper 80H, and ninth damper 80I.

The number of total vales/dampers 80 can vary in accordance with the present invention. For example, although each line/conduit 70 is shown in FIGS. 1-3 as having one damper 80, it is possible in accordance with the present invention for each conduit to have more than one damper, and/or for certain conduits not to have a damper.

Dampers suitable for use in connection with the present invention include, but are not limited to those sold commercially by Bachmann Industries Inc. of Auburn, Me. and those sold commercially by Effox Inc. of Cincinnati, Ohio. Valves suitable for use in connection with the present invention include, but are not limited to rotary valves, such as VRTO rotary valves sold commercially by Eisenmann Corp. of Crystal Lake, Ill.

Upon entering the first chamber 20A, the mixed gas and reactant flows in a first direction, which, as shown in FIG. 1, is upflow. It is understood, however, that the first direction could be downflow instead. The flow direction of the gas is determined or influenced both by the presence of one or more gas movement influencing devices 90A (e.g., one or more fans), and by which of the various dampers/valves 80 are open.

For example, in order to ensure that the $NO_x$-containing mixed gas and reactant flows in a desired first direction (e.g., upwardly) upon being introduced to the first chamber 20A, all dampers 80 are closed with the exception of the fifth damper 80E. Thus, if the gas movement influencing device 90A is actuated (i.e., turned on), then the gas within the apparatus 10 will be drawn toward the open damper 80E via the most direct path, which, based on the location of the open damper 80E, would cause the gas to flow in a first direction (i.e., upwardly) through the first chamber 20A, into the first headspace 50A, into the second headspace 50B, and then in a second, opposite direction (i.e., downwardly) into the second chamber 20B, and then out of the second chamber via fifth conduit 70E.

Referring again to the first cycle (as depicted in FIG. 1) of the RSCR process, after the $NO_x$-containing mixed gas and reactant is introduced into the first chamber 20A of the apparatus 10, the gas encounters the first heat transfer area 30A, which, as noted above, has been pre-heated to a temperature higher than that of the mixed gas and reactant. As the $NO_x$-containing mixed gas and reactant passes through the first heat transfer area 30A, heat from the first heat transfer area is transferred to the mixed gas and reactant, thus raising the temperature of the mixed gas and reactant.

Generally, the temperature of the first heat transfer area 30A just prior being encountered by the gas is in the range of about 300° F. to about 700° F., with an average temperature of about 450° F. to about 550° F. being currently preferred and an exit temperature of about 500° F. being currently most preferred, whereas the temperature of the first heat transfer area just after heat has been transferred therefrom to the gas flowing therethrough is generally in the range of about 200° F. to about 650° F., with an average temperature of about 300° F. to about 500° F. being currently preferred and an exit temperature of about 450° F. being currently most preferred.

The temperature of the gas upon encountering the first heat transfer area 30A is generally in the range of about 200° F. to about 400° F., with a temperature of about 300° F. to about 350° F. being currently preferred and a temperature of about 325° F. being currently most preferred, whereas the temperature of the gas upon departing the first heat transfer area after having transferred heat to the gas is generally in the range of about 450° F. to about 700° F., with a temperature of about 450° F. to about 550° F. being currently preferred and a temperature of about 500° F. being currently most preferred.

After the mixed gas and reactant has passed through or over the first heat transfer area 30A, it proceeds (flows) in the same direction (i.e., upflow in the embodiment depicted in FIG. 1) to the first catalyst area 40A. Because the temperature of the mixed gas and reactant has been raised at the first heat transfer area 30A, catalytic reactions are able to occur at the first catalyst area 40A. Exemplary such reactions are shown below, wherein it is noted that other reactions may occur in lieu of or in addition to those listed. The reactions that take place are effective to cause $NO_x$ within the mixed $NO_x$-containing gas and reactant to be entirely or at least partially converted to harmless constituent gases:

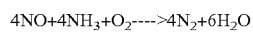

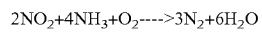

Certain side reactions also may occur during catalysis, such as:

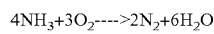

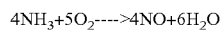

Upon departing the first catalyst area 40A, the treated gas enters the first headspace area 50A, flows into the second headspace area 50B, and then enters the second chamber 20B. Once within the second chamber 20B, the gas flows in an opposite direction as compared to the direction of flow in the first chamber 20A. According to a currently preferred embodiment of the first cycle of the present invention, the direction of flow in the first chamber 20A is upflow and the direction of flow in the second chamber 20B is downflow. However, it should be noted that the gas can flow in any direction in the first chamber 20A and the second chamber 20B during the first cycle of the invention.

Within the second chamber 20B, the flowing gas initially encounters the second catalyst area 40B and then the second heat transfer area 30B. As noted above, and to ensure the gas takes this particular route, it is currently preferred that at least one damper/valve be open and that gas movement influencing device 90A be activated. In the case of the first cycle, the damper that is opened should be one (e.g., the fifth damper 80E) that is in communication with a conduit (e.g., the fifth conduit 70E), which, in turn, is in communication with the second chamber 20B. This ensures that the gas will be directed from the first chamber 20A to the second chamber 20B via the most direct path/route.

According to an optional, yet currently preferred embodiment of the first cycle of the present invention, at least one burner 60 is placed within one or more of the first headspace area 50A, the second headspace area 50B or therebetween. The presence of the at least one burner 60 causes the gas to be reheated to a temperature suitable for the gas to undergo further catalytic reaction at the second catalyst area 40B. Also, any or all of the at least one burner 60 can be activated to provide additional heat to the apparatus, and, in particular, to one or more of the heat transfer areas 30.

In accordance with an exemplary embodiment of the present invention, the temperature of the gas upon encountering the burner 60 is in the range of about 450° F. to about 700° F., with a temperature of about 500° F. being currently preferred, whereas the temperature of the burner 60 upon the gas encountering it is generally in the range of about 1200° F. to about 2000° F., with a temperature of about 1500° F. being currently preferred. Upon reaching the second catalyst area 40B, the temperature of the burner-heated gas is generally in the range of about 460° F. to about 725° F., with a temperature of about 510° F. being currently preferred.

Once it reaches the second catalyst area 40B, the gas undergoes additional catalytic reactions, which result in still further $NO_x$ removal from the gas. In accordance with experiments performed in furtherance of the present invention, it has been observed that levels of ammonia slip are not excessively high despite the presence of high enough concentrations of ammonia ($NH_3$) in the gas to ensure that the gas can undergo successive catalytic reactions at the first and second catalyst areas 40A, 40B. This is highly beneficial and quite unexpected.

After undergoing catalytic reaction at the second catalyst area 40B, the gas proceeds to the second heat transfer area 30B. When the gas arrives at the second heat transfer area 30B, the temperature of the second heat transfer area will be less than that of the gas. Thus, as the gas passes through the second heat transfer area 30B, heat from the gas is transferred to the second heat transfer area to raise the temperature of the second heat transfer area.

Generally, the temperature of the second heat transfer area 30B just prior to being encountered by the gas is in the range of about 300° F. to about 710° F., with an average temperature of about 450° F. to about 550° F. being currently preferred and an exit temperature of about 325° F. being currently most preferred, whereas the temperature of the second heat transfer area just after heat has been transferred thereto by the gas flowing therethrough is generally in the range of about 300° F. to about 700° F., with an average temperature of about 440° F. to about 540° F. being currently preferred and an exit temperature of about 335° F. being currently most preferred.

The temperature of the gas upon encountering the second heat transfer area 30B is generally in the range of about 450° F. to about 725° F., with a temperature of about 450° F. to about 550° F. being currently preferred and a temperature of about 510° F. being currently most preferred, whereas the temperature of the gas upon departing the second heat transfer area after having transferred heat to the second heat transfer area is generally in the range of about 215° F. to about 415° F., with a temperature of about 315° F. to about 365° F. being currently preferred and a temperature of about 335° F. being currently most preferred.

After flowing through the second heat transfer area 30B, the gas flows into the fifth conduit 70E due to the fifth damper 80E being open and the gas movement influencing device 90A being actuated (i.e., turned on). The gas then flows through the fifth conduit 70E, passing the fifth damper 80E and eventually being released into the atmosphere through an expulsion area 100 (e.g., a stack).

Because the treated gas has transferred heat to the second heat transfer area 30B, the temperature of the gas will be similar or approximately equal to its temperature upon first entering the apparatus 10 for treatment. This is beneficial because it allows for little to no energy loss in the RSCR system.

Moreover, because the treated gas does not emerge at an elevated temperature as compared to its temperature when it entered the apparatus, the expulsion area 100 need not be constructed of specialized materials. In some "tail end" SCR systems, the gas emerges at a comparatively higher temperature, such that the expulsion area is required to be made of specialized materials that can withstand the higher temperature gas. In contrast, no modifications to the design of existing expulsion areas 100 or to the materials from which they are constructed are required in accordance with the present invention.

Second Cycle of RSCR Process (FIG. 2)

Following completion of the first cycle of the RSCR process, the second cycle is commenced whereby additional $NO_x$-containing gas enters the RSCR apparatus 10 for treatment. There is no set time frame for commencing the second cycle after the completion of the first cycle; however, it is currently preferred to commence the second cycle within about three minutes of completion of the first cycle. This is because if there is temporal proximity between the completion of the first cycle and the commencement of the second cycle, then the process can utilize the benefits of the residual heat that remains in the second heat transfer area 30B following the completion of the first cycle.

The purpose of the second cycle is the same as that of the first cycle, namely to remove contaminants (e.g., $NO_x$) from gas entering the apparatus 10. Prior to the commencement of the second cycle, reactant (e.g., $NH_3$) is mixed with the gas. The mixing process, equipment and conditions are generally identical to those performed prior to the first cycle of the process.

However, unlike the first cycle, it is not necessary to preheat any heat transfer areas 30 of the apparatus 10 in preparation for the second cycle of the process. This is because the second heat transfer area 30B—through which the treated gas from the first cycle passed just prior to exiting the apparatus 10—will have retained residual heat from the treated gas. Consequently, and in accordance with the second cycle of the invention, mixed gas and reactant is supplied to the second chamber 20B of the apparatus via fourth conduit 70D such that the mixed gas and reactant first encounters the residually-heated second heat transfer area 30B.

As shown in FIG. 2, and in accordance with a second cycle of the RSCR process of the present invention, the $NO_x$-containing mixed gas and reactant is introduced into the second chamber 20B of the apparatus 10 via a conduit or other like transport medium 70D. The mixed gas and reactant enter the second chamber 20B after having passed through a damper/valve 80D.

Upon entering the second chamber 20B, the mixed gas and reactant flows in a first direction, which, as shown in FIG. 2, is upflow. It is understood, however, that the first direction could be downflow instead. The flow direction of the gas is determined or influenced both by the presence of one or more gas movement influencing devices 90A (e.g., one or more fans), and by which of the various dampers/valves 80 are open.

For example, in order to ensure that the $NO_x$-containing mixed gas and reactant flows in a desired first direction (e.g., upwardly) upon being introduced to the second chamber 20B, all dampers 80 are closed with the exception of the eighth damper 80H. Thus, if the gas movement influencing device 90A is actuated (i.e., turned on), then the gas within the apparatus 10 will be drawn toward the open damper 80H via the most direct path, which, based on the location of the open damper 80H, would cause the gas to flow in a first direction (i.e., upwardly) through the second chamber 20B, into the second headspace 50B, into the second headspace 50C, and then in a second, opposite direction (i.e., downwardly) into the third chamber 20C, and then out of the third chamber via eighth conduit 70H.

Still referring to the second cycle (as depicted in FIG. 2) of the RSCR process, after the $NO_x$-containing mixed gas and reactant is introduced into the second chamber 20B of the apparatus 10, the gas encounters the second heat transfer area 30B, which, as noted above, has retained residual heat from the first cycle such that the second heat transfer area has a higher temperature than that of the mixed gas and reactant. As the $NO_x$-containing mixed gas and reactant passes through the second heat transfer area 30B, heat from the second heat transfer area is transferred to the mixed gas and reactant, thus raising the temperature of the mixed gas and reactant.

Generally, the temperature of the second heat transfer area 30B just prior being encountered by the gas is in the range of about 300° F. to about 700° F., with an average temperature of about 450° F. to about 550° F. being currently preferred and an exit temperature of about 500° F. being currently most preferred, whereas the temperature of the second heat transfer area just after heat has been transferred therefrom to the gas flowing therethrough is generally in the range of about 200° F. to about 650° F., with an average temperature of about 300° F. to about 500° F. being currently preferred and a temperature of about 450° F. being currently most preferred.

The temperature of the gas upon encountering the second heat transfer area 30B is generally in the range of about 200° F. to about 400° F., with a temperature of about 300° F. to about 350° F. being currently preferred and a temperature of about 325° F. being currently most preferred, whereas the temperature of the gas upon departing the second heat transfer area after having transferred heat to the gas is generally in the range of about 450° F. to about 700° F., with a temperature of about 450° F. to about 550° F. being currently preferred and a temperature of about 500° F. being currently most preferred.

After the mixed gas and reactant has passed through or over the second heat transfer area 30B, it proceeds (flows) in the same direction (i.e., upflow in the embodiment depicted in FIG. 2) to the second catalyst area 40B. Because the temperature of the mixed gas and reactant has been raised at the second heat transfer area 30B, catalytic reactions are able to occur at the second catalyst area 40B. Exemplary such reactions are shown below, wherein it is noted that other reactions may occur in lieu of or in addition to those listed. The reactions that take place are effective to cause $NO_x$ within the mixed $NO_x$-containing gas and reactant to be entirely or at least partially converted to harmless constituent gases:

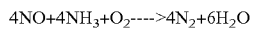

$4NO+4NH_3+O_2 \longrightarrow 4N_2+6H_2O$

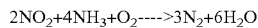

$2NO_2+4NH_3+O_2 \longrightarrow 3N_2+6H_2O$

Certain side reaction also may occur during catalysis, such as:

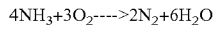

$4NH_3+3O_2 \longrightarrow 2N_2+6H_2O$

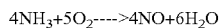

$4NH_3+5O_2 \longrightarrow 4NO+6H_2O$

Upon departing the second catalyst area 40B, the treated gas enters the second headspace area 50B, flows into the third headspace area 50C, and then enters the third chamber 20C. Once within the third chamber 20C, the gas flows in an opposite direction as compared to the direction of flow in the first chamber 20B. According to a currently preferred embodiment of the second cycle of the present invention, the direction of flow in the second chamber 20B is upflow and the direction of flow in the third chamber 20C is downflow. However, it should be noted that the gas can flow in any direction in the second chamber 20B and the third chamber 20C during the second cycle.

According to an optional, yet currently preferred embodiment of the second cycle of the present invention, at least one burner 60 is placed within one or more of the second headspace area 50B, the third headspace area 50C or therebetween. The presence of the at least one burner 60 causes the gas to be reheated to a temperature suitable for the gas to undergo further catalytic reaction at the third catalyst area 40C.

In accordance with an exemplary embodiment of the present invention, the temperature of the gas upon encountering the burner 60 is in the range of about 450° F. to about 700° F., with a temperature of about 500° F. being currently preferred, whereas the temperature of the burner 60 upon the gas encountering it is generally in the range of about 1200° F. to about 2000° F., with a temperature of about 1500° F. being currently preferred. Upon reaching the third catalyst area 40C, the temperature of the burner-heated gas is generally in the range of about 460° F. to about 725° F., with a temperature of about 510° F. being currently preferred.

Within the third chamber 20C, the flowing gas initially encounters first the third catalyst area 40C and then the third heat transfer area 30C. Upon reaching the third catalyst area 40C during the second cycle, the gas undergoes additional catalytic reactions, which result in still further $NO_x$ removal from the gas. In accordance with experiments performed in furtherance of the present invention, it has been observed that levels of ammonia slip are not excessively high in accordance with the RSCR process of the present invention despite the presence of high enough concentrations of ammonia ($NH_3$) in the gas to ensure that the gas can undergo successive catalytic reactions at the second and third catalyst areas 40B, 40C. This is highly beneficial and quite unexpected.

After undergoing catalytic reaction at the third catalyst area 40C, the gas proceeds to the third heat transfer area 30C. When the gas arrives at the third heat transfer area 30C, the temperature of the third heat transfer area will be less than that of the gas. Thus, as the gas passes through the third heat transfer area 30C, heat from the gas is transferred to the third heat transfer area to raise the temperature of the third heat transfer area.

Generally, the temperature of the third heat transfer area 30C just prior to being encountered by the gas is in the range of about 300° F. to about 710° F., with an average temperature of about 450° F. to about 550° F. being currently preferred and an exit temperature of about 325° F. being currently most preferred, whereas the temperature of the third heat transfer area just after heat has been transferred thereto by the gas flowing therethrough is generally in the range of about 300° F. to about 700° F., with an average temperature of about 440° F. to about 540° F. being currently preferred and an exit temperature of about 335° F. being currently most preferred.

The temperature of the gas upon encountering the third heat transfer area 30C is generally in the range of about 450° F. to about 725° F., with a temperature of about 450° F. to about 550° F. being currently preferred and a temperature of about 510° F. being currently most preferred, whereas the temperature of the gas upon departing the third heat transfer area after having transferred heat to the third heat transfer area is generally in the range of about 215° F. to about 415° F., with a temperature of about 315° F. to about 365° F. being currently preferred and a temperature of about 335° F. being currently most preferred.

After flowing through the third heat transfer area 30C, the gas flows into the eighth conduit 70H due to the eighth damper 80H being open and the gas movement influencing device 90A being actuated (i.e., turned on). The gas then flows through the eighth conduit 70H, passing the eighth damper 80H and eventually being released into the atmosphere through an expulsion area 100 (e.g., a stack).

Because the treated gas has transferred heat to the third heat transfer area 30C, the temperature of the gas will be similar or approximately equal to its temperature upon first entering the apparatus 10 for treatment. This is beneficial for the reasons described above with respect to the first cycle.

Third Cycle of the RSCR Process (FIG. 3)

Following completion of the second cycle of the RSCR process, the third cycle is commenced whereby additional $NO_x$-containing gas enters the RSCR apparatus 10 for treatment. There is no set time frame for commencing the third cycle after the completion of the second cycle; however, it is currently preferred to commence the third cycle within about 3 minutes of completion of the second cycle. This is because if there is temporal proximity between the completion of the second cycle and the commencement of the third cycle, then the process can utilize the benefits of the residual heat that remains in the third heat transfer area 30C following completion of the second cycle.

The purpose of the third cycle is the same as that of the first and second cycles, namely to remove contaminants (e.g., $NO_x$) from gas entering the apparatus 10. As with the first and second cycles, reactant (e.g., $NH_3$) is mixed with the $NO_x$-containing gas prior to the commencement of the third cycle. Also, the mixing process, equipment and conditions for the third cycle are generally identical to those performed prior to the first and second cycles of the process.

However, like the second cycle and unlike the first cycle, it is not necessary to pre-heat any heat transfer areas 30 of the apparatus in preparation for the third cycle of the process. This is because the third heat transfer area 30C—through which the treated gas from the second cycle passed just prior to exiting the apparatus 10—will have retained residual heat from the gas. Consequently, and in accordance with the third cycle of the invention, mixed gas and reactant is supplied to the third chamber 20C of the apparatus via seventh conduit 70G such that the mixed gas and reactant first encounters the residually-heated third heat transfer area 30C.

Generally, the third cycle proceeds in the same manner as the first and second cycles, but involves different chambers. In particular, during the third cycle the third chamber functions just as the first chamber in the first cycle and the second chamber in the second cycle, and during the third cycle the first chamber functions just as the second chamber in the first cycle and the third chamber in the second cycle.

As shown in FIG. 3, and in accordance with a third cycle of the RSCR process of the present invention, the $NO_x$-containing mixed gas and reactant is introduced into the third chamber 20C of the apparatus 10 via a conduit or other like transport medium 70G. The mixed gas and reactant enter the third chamber 20C after having passed through a damper/valve 80G.

Upon entering the third chamber 20C, the mixed gas and reactant flows in a first direction, which, as shown in FIG. 3, is upflow. It is understood, however, that the first direction could be downflow instead. The flow direction of the gas is determined or influenced both by the presence of one or more gas movement influencing devices 90A (e.g., one or more fans), and by which of the various dampers/valves 80 are open.

For example, in order to ensure that the $NO_x$-containing mixed gas and reactant flows in a desired first direction (e.g., upwardly) upon being introduced to the third chamber 20C, all dampers 80 are closed with the exception of the second damper 80B. Thus, if the gas movement influencing device 90A is actuated (i.e., turned on), then the gas within the apparatus 10 will be drawn toward the open damper 80B via the most direct path, which, based on the location of the open damper 80B, would cause the gas to flow in a first direction (i.e., upwardly) through the third chamber 20C, into and through the third headspace area 50C, into and through the second headspace area 50B, and into and through the first headspace area 50A. The gas then flows in a second, opposite direction (i.e., downwardly) into the first chamber 20A, and then out of the first chamber via second conduit 70B.

Still referring to the third cycle (as depicted in FIG. 3) of the RSCR process, after the $NO_x$-containing mixed gas and reactant is introduced into the third chamber 20C of the apparatus 10, the gas encounters the third heat transfer area 30C, which, as noted above, has retained residual heat from the second cycle such that the third heat transfer area has a higher temperature than that of the mixed gas and reactant. As the $NO_x$-containing mixed gas and reactant passes through the third heat transfer area 30C, heat from the third heat transfer area is transferred to the mixed gas and reactant, thus raising the temperature of the mixed gas and reactant.

Generally, the temperature of the third heat transfer area 30C just prior being encountered by the gas is in the range of about 300° F. to about 700° F., with an average temperature of about 450° F. to about 550° F. being currently preferred and an exit temperature of about 500° F. being currently most preferred, whereas the temperature of the third heat transfer area just after heat has been transferred therefrom to the gas flowing therethrough is generally in the range of about 200° F. to about 650° F., with an average temperature of about 300° F. to about 500° F. being currently preferred and an exit temperature of about 450° F. being currently most preferred.

The temperature of the gas upon encountering the third heat transfer area 30C is generally in the range of about 200° F. to about 400° F., with a temperature of about 300° F. to about 350° F. being currently preferred and a temperature of about 325° F. being currently most preferred, whereas the temperature of the gas upon departing the third heat transfer area after having transferred heat to the gas is generally in the range of about 450° F. to about 700° F., with a temperature of about 450° F. to about 550° F. being currently preferred and a temperature of about 500° F. being currently most preferred.

After the mixed gas and reactant has passed through or over the third heat transfer area 30C, it proceeds (flows) in the same direction (i.e., upflow in the embodiment depicted in FIG. 3) to the third catalyst area 40C. Because the temperature of the mixed gas and reactant has been raised at the third heat transfer area 30C, catalytic reactions are able to occur at the third catalyst area 40C. Exemplary such reactions are shown below, wherein it is noted that other reactions may occur in lieu of or in addition to those listed. The reactions that take place are effective to cause $NO_x$ within the mixed $NO_x$-containing gas and reactant to be entirely or at least partially converted to harmless constituent gases:

$$4NO + 4NH_3 + O_2 \longrightarrow 4N_2 + 6H_2O$$

$$2NO_2 + 4NH_3 + O_2 \longrightarrow 3N_2 + 6H_2O$$

Certain side reaction also may occur during catalysis, such as:

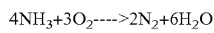

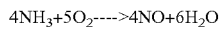

Upon departing the third catalyst area 40C, the treated gas enters the third headspace area 50C, flows into the second headspace area 50B, then flows into the first headspace area 50A, and then enters the first chamber 20A. Once within the first chamber 20A, the gas flows in an opposite direction as compared to the direction of flow in the third chamber 20C. According to a currently preferred embodiment of the third cycle of present invention, the direction of flow in the third chamber 20C is upflow and the direction of flow in the first chamber 20A is downflow. However, it should be noted that the gas can flow in any direction in the third chamber 20C and the first chamber 20A during the third cycle.

According to an optional, yet currently preferred embodiment of the third cycle of the present invention, at least one burner 60 is placed within one or more of the third headspace area 50C, the second headspace area 50B, the first headspace area 50A or therebetween. The presence of the at least one burner 60 causes the gas to be reheated to a temperature suitable for the gas to undergo further catalytic reaction at the first catalyst area 40A.

As shown in FIG. 3, there is a burner 60 located between the third headspace area 50C and the second headspace area 50B, and another burner 60 located between the second headspace area and the first headspace area 50A. As noted above, the burner 60 located between the first headspace area 50A and the second headspace area 50B is responsible—during the first cycle—for heating the gas prior to the gas entering the second catalyst area 40B, whereas the burner 60 located between the second headspace area and the third headspace area 50C is responsible—during the second cycle—for heating the gas prior to the gas entering the third catalyst area 40C.

In accordance with the third cycle, it is currently preferred to heat the gas between when it departs the third catalyst area 40C and when it enters the first chamber 20A for further treatment. However, it is currently preferred not to heat the gas with both burners 60 depicted in FIG. 3. Thus, according to a currently preferred embodiment of the third cycle of the RSCR process of the present invention, the gas that leaves the third chamber 20C is heated only by the burner 60 located between the second headspace area 50B and the first headspace area 50A, thus ensuring that the gas is most likely to retain the proper amount of heat prior to encountering the first catalyst area 40A.

It should be noted that in accordance with the third cycle of the RSCR process of the present invention, it is also possible to heat the gas that leaves the third chamber 20C with both burners 60, or solely by means of the burner located between the third headspace area 50C and the second headspace area 50B. However, neither of these approaches is currently preferred because heating the gas with both burners could cause the gas to have an undesirably high temperature when it encounters the first catalyst area 40A, and because heating the gas with only the burner 60 located between the third headspace area 50C and the second headspace area 50B could cause the gas to have an undesirably low temperature when it encounters the first catalyst area 40A. The ability to selectively activate and deactivate the burners 60 is generally known in the art, an can be achieved, e.g., via computer controls.

In accordance with an exemplary embodiment of the present invention, the temperature of the gas upon encountering the burner 60 located between the second headspace area 50B and the first headspace area 50A is in the range of about 450° F. to about 700° F., with a temperature of about 500° F. being currently preferred, whereas the temperature of the burner 60 located between the second headspace area 50B and the first headspace area 50A upon the gas encountering it is generally in the range of about 1200° F. to about 2000° F., with a temperature of about 1500° F. being currently preferred. Upon reaching the second catalyst area 40B, the temperature of the burner-heated gas is generally in the range of about 460° F. to about 725° F., with a temperature of about 510° F. being currently preferred.

Within the first chamber 20A, the flowing gas initially encounters the first catalyst area 40A and then the first heat transfer area 30A. At the first catalyst area 40A during the third cycle, the gas undergoes additional catalytic reactions, which result in still further $NO_x$ removal from the gas. In accordance with experiments performed in furtherance of the present invention, it has been observed that levels of ammonia slip are not excessively high in accordance with the RSCR process of the present invention despite the presence of high enough concentrations of ammonia ($NH_3$) in the gas to ensure that the gas can undergo successive catalytic reactions at the third and first catalyst areas 40C, 40A. This is highly beneficial and quite unexpected.

After undergoing catalytic reaction at the first catalyst area 40A, the gas proceeds to the first heat transfer area 30A. When the gas arrives at the first heat transfer area 30A, the temperature of the first heat transfer area will be less than that of the gas. Thus, as the gas passes through the first heat transfer area, heat from the gas is transferred to the first heat transfer area 30A to raise the temperature of the first heat transfer area.

Generally, the temperature of the first heat transfer area 30A just prior to being encountered by the gas is in the range of about 300° F. to about 710° F., with an average temperature of about 450° F. to about 550° F. being currently preferred and an exit temperature of about 325° F. being currently most preferred, whereas the temperature of the first heat transfer area just after heat has been transferred thereto by the gas flowing therethrough is generally in the range of about 300° F. to about 700° F., with an average temperature of about 440° F. to about 540° F. being currently preferred and an exit temperature of about 335° F. being currently most preferred.

The temperature of the gas upon encountering the first heat transfer area 30A is generally in the range of about 450° F. to about 725° F., with a temperature of about 450° F. to about 550° F. being currently preferred and a temperature of about 510° F. being currently most preferred, whereas the temperature of the gas upon departing the first heat transfer after having transferred heat to the first heat transfer area is generally in the range of about 215° F. to about 415° F., with a temperature of about 315° F. to about 365° F. being currently preferred and a temperature of about 335° F. being currently most preferred.

After flowing through the first heat transfer area 30A, the gas flows into the second conduit 70B due to the second damper 80B being open and the gas movement influencing device 90A being actuated (i.e., turned on). The gas then flows through the second conduit 70B, passing the second damper 80B and eventually being released into the atmosphere through an expulsion area 100 (e.g., a stack).

Because the treated gas has transferred heat to the first heat transfer area 30A, the temperature of the gas will be similar or approximately equal to its temperature upon first entering the apparatus 10 for treatment. This is beneficial for the reasons described above with respect to the first cycle.

Subsequent Cycles

If there are subsequent cycles of the RSCR process, they would be patterned after the first, second and third cycles. Because there is residual heat in the first heat transfer area 30A following completion of the third cycle, a fourth cycle—if it were to occur—would proceed identically to the first cycle, except for the fact that the first chamber was pre-heated prior to the commencement of the first cycle, whereas it possesses residual heat prior to the commencement of the fourth cycle.

Also, because there would be residual heat in the second heat transfer area 30B following completion of the fourth cycle of the RSCR process, a fifth cycle—if it were to occur—would proceed identically to the second cycle, which introduced gas into the second chamber 20B to encounter the pre-heated second heat transfer area. And because there would be residual heat in the third heat transfer area 30C following completion of the fifth cycle of the RSCR process, a sixth cycle—if it were to occur—would proceed identically to the third cycle, which introduced gas into the third chamber 20C to encounter the pre-heated first heat transfer area.

Moreover, if they were to occur, seventh, tenth, thirteenth, . . . cycles would be identical to the first and fourth cycles, and eighth, eleventh, fourteenth, . . . cycles would be identical to the second and fifth cycles, and ninth, twelfth, fifteenth, . . . cycles would be identical to the third and sixth cycles. Thus, the apparatus 10 could be continually operated/utilized in accordance with an RSCR process having a plurality or multiplicity of cycles.

Purging of Residual Reactant

Optionally, but according to a currently preferred embodiment of the present invention, the RSCR process of FIGS. 1-3 undergoes periodic purging, wherein residual reactant (e.g., $NH_3$) is removed from the apparatus 10. The reason for performing such purging is to prevent, or at least to minimize the amount of reactant that is expelled into the atmosphere through the expulsion area 100.

Because each cycle of the RSCR process generally involves fewer chambers 20 than are included in the apparatus 10, the purge cycle is generally timed such that one or more chambers are purged when such chamber(s) is/are not being utilized in connection with the RSCR process. For example, the first cycle (and, if performed, the fourth cycle, seventh cycle, tenth cycle, etc.) involves the first chamber 20A and the second chamber 20B. Thus, during the first cycle, a damper 80 (e.g., ninth damper 80I) is opened and gas movement influencing device 90B (e.g., a fan) is activated such that reactant within the third chamber 20C is purged from that chamber.

According to a currently preferred embodiment of the present invention, activation of the gas movement influencing device 90B is timed such that it does not interfere with the desired path of the gas during the first cycle. For example, if the ninth damper 80I was opened as the gas was traveling from the first headspace area 50A to the second headspace area 50B, then the gas might not follow the desired path into the second chamber 20B. Thus, it is currently preferred to activate the gas movement influencing device 90B only after the gas has entered the second chamber 20B.

One can control the timing and operation of the equipment involved in the purge cycle via techniques and equipment known to one of ordinary skill in the art, including but not limited to computer controls.

Like the purge cycle for the first cycle, the purge cycles for the second and third cycles focus on removing reactant from the chamber(s) 20 not being used during those cycles. For example, the second cycle (and, if performed, the fifth cycle, eighth cycle, eleventh cycle, etc.) involves the second chamber 20B and the third chamber 20C. Thus, during the second cycle, a damper 80 (e.g., third damper 80C) is opened and gas movement influencing device 90B (e.g., a fan) is activated such that reactant within the first chamber 20A is purged from that chamber. Similarly, the third cycle (and, if performed, the sixth cycle, ninth cycle, twelfth cycle, etc.) primarily involves the third chamber 20C and the first chamber 20A. Thus, during the third cycle, a damper 80 (e.g., sixth damper 80F) is opened and gas movement influencing device 90B (e.g., a fan) is activated such that reactant within the second chamber 20B is purged from that chamber.

Also, like the purge cycle for the first cycle, the purge cycles for the second and third cycles of the RSCR process are timed such that they do not interfere with the desired path/route for the gas. Thus, for the purge cycle of the second cycle, it is currently preferred to activate the gas movement influencing device 90B only after the gas has entered the third chamber 20C, and for the purge cycle of the third cycle, it is currently preferred to activate the gas movement influencing device 90B only after the gas has entered the first chamber 20A.

In accordance with an optional yet currently preferred embodiment of the present invention, the residual reactant that is purged from the apparatus 10 is harnessed for use in connection with one or more subsequent cycles of the RSCR process. As shown in FIGS. 1-3, the purged reactant is removed from the apparatus via a conduit 70 (i.e., conduit 70I in the first cycle, conduit 70C in the second cycle, and conduit 70F in the third cycle), and then fed to the reactant supply source (not shown) such that it can be added to the reactant supply for future cycles of the RSCR process. Such an embodiment is currently preferred, especially in instances wherein the reactant is ammonia. This is because it not only allows for removal of ammonia that, if left in the apparatus 10, could increase the likelihood of ammonia slip, but also because provides a cost savings by enabling less overall ammonia to be needed during the process.

According to an alternative embodiment of the present invention, and during any or all of the cycles of the RSCR process, one or more reactants can be introduced directly into one of the chambers 20 of the RSCR apparatus 10 in lieu of or in addition to the reactant that is supplied upstream of (i.e., outside of) the apparatus. If that occurs, it is currently preferred to introduce the one or more reactants at a location between a heat transfer area 30 and a catalyst area 40. Various techniques and equipment known to one of ordinary skill in the art are suitable for introducing the one or more reactants at that location, with such techniques including, but not limited to introducing the reactant(s) via a grid.

According to another alternative embodiment of the present invention, one or more of the catalyst areas 40 can include multiple layers/beds, such that the catalyst area(s) can function as a two-step catalyst to enable reduction of harmful contaminants in addition to (or in lieu of) $NO_x$. According to such an embodiment, and by way of non-limiting example, one or more the catalyst areas 40 can include a layer or bed of at least one oxidation catalyst in order to cause reduction of carbon monoxide and/or so-called volatile organic compounds (VOCs). An exemplary oxidation catalyst is a precious metal oxidation catalyst.

Figure 4:
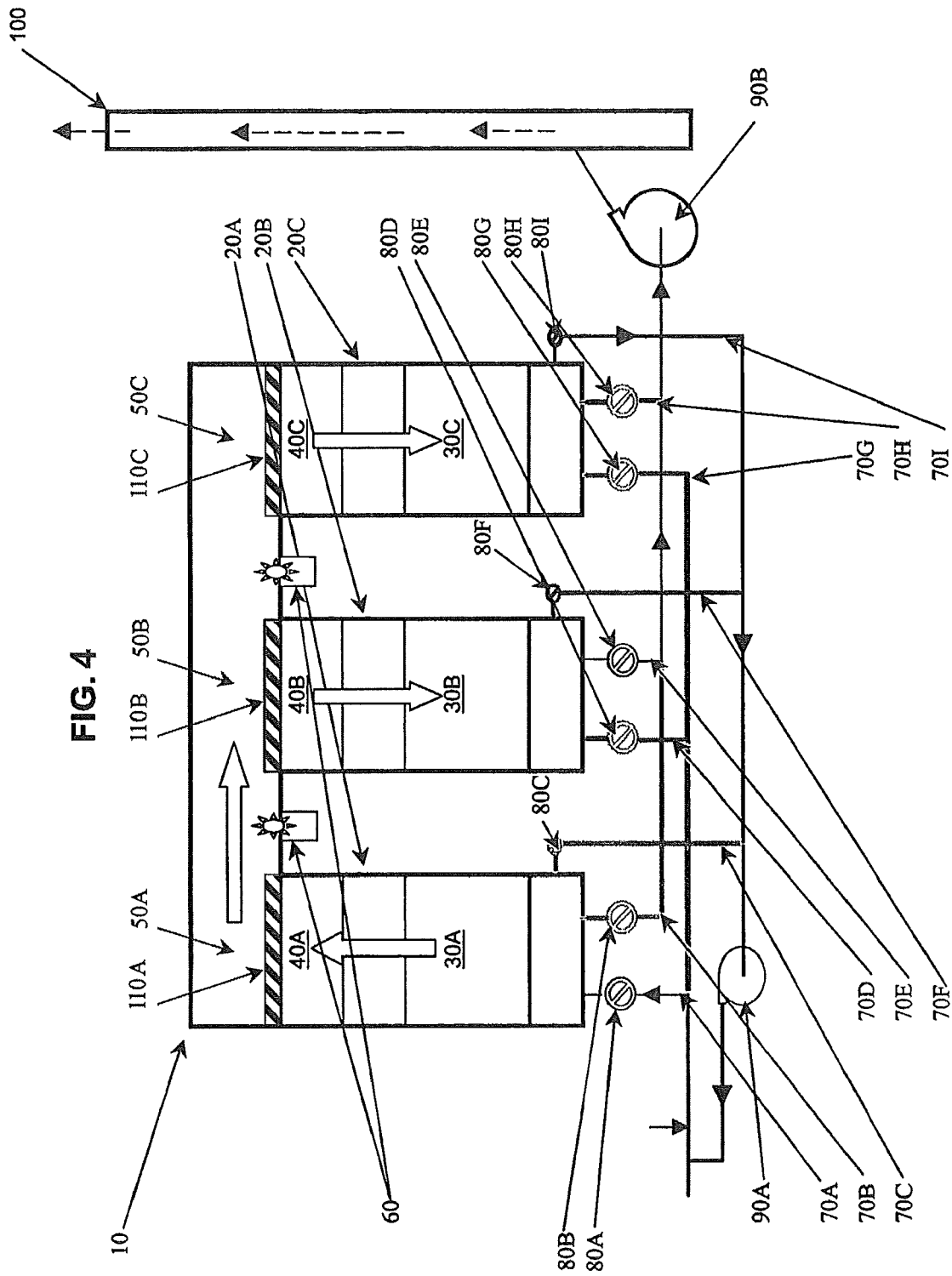
FIG. 4 is a schematic view of another exemplary embodiment of an RSCR apparatus in accordance with the invention, showing catalyst beds for reduction of carbon monoxide included in the headspace area above each catalyst chamber.

FIG. 4 shows an example in which RSCR apparatus 10, has a carbon monoxide reducing catalyst 110A,B,C arranged in the headspace area 50 above each respective catalyst chamber 20. This configuration can achieve simultaneous CO and $NO_x$ removal within a single system using the same process cycles described above. Since the RSCR process operates at approximately 600° F., which is an ideal operating temperature for CO removing catalysts, combining CO and $NO_x$ catalysts accomplishes simultaneous removal of $NO_x$ and CO from flue gases.

CO catalyst 110 is an oxidizing catalyst that operates without reagent to convert CO to $CO_2$. The CO catalyst 110A,B,C includes platinum and/or palladium with small amounts of rhodium on a nickel steel or ceramic substrate. Commercially available CO catalyst materials include EnviCat® 2307 and EnviCat® 5304 from Süd Chemie AG of Munich, Germany, and ADCAT™ from EmeraChem, LLC of Knoxville, Tenn. These materials are often referred to as "VOC catalyst" because they are also useful for oxidation of volatile organic compounds ("VOC"). The catalyst material is coated on a metal honeycomb array and encased in steel modules dimensioned to fit in the apparatus. Steel modules dimensioned 2 feet by 1.5 feet by 2 inches, for example, can provide adequate CO removal for the same flue gases described above with the exemplary RSCR apparatus shown in FIGS. 1-3. Those skilled in the art will readily appreciate that any suitable CO catalyst materials, module configuration, and size can be used without departing from the spirit and scope of the invention.

Figure 5:
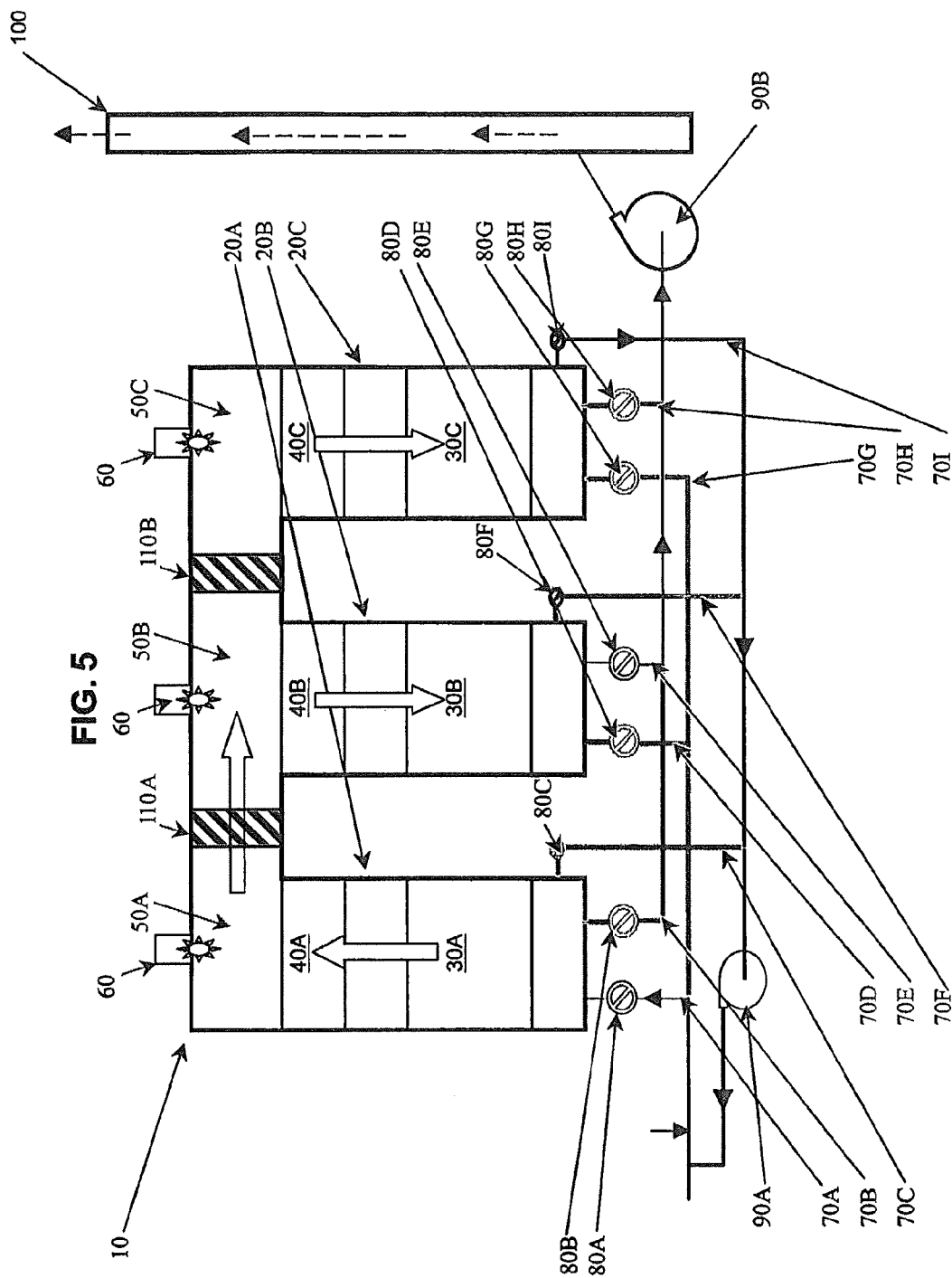
FIG. 5 is a schematic view of another exemplary embodiment of an RSCR apparatus in accordance with the invention, showing catalyst beds for reduction of carbon monoxide in the headspace area between the catalyst chambers.
Figure 6:
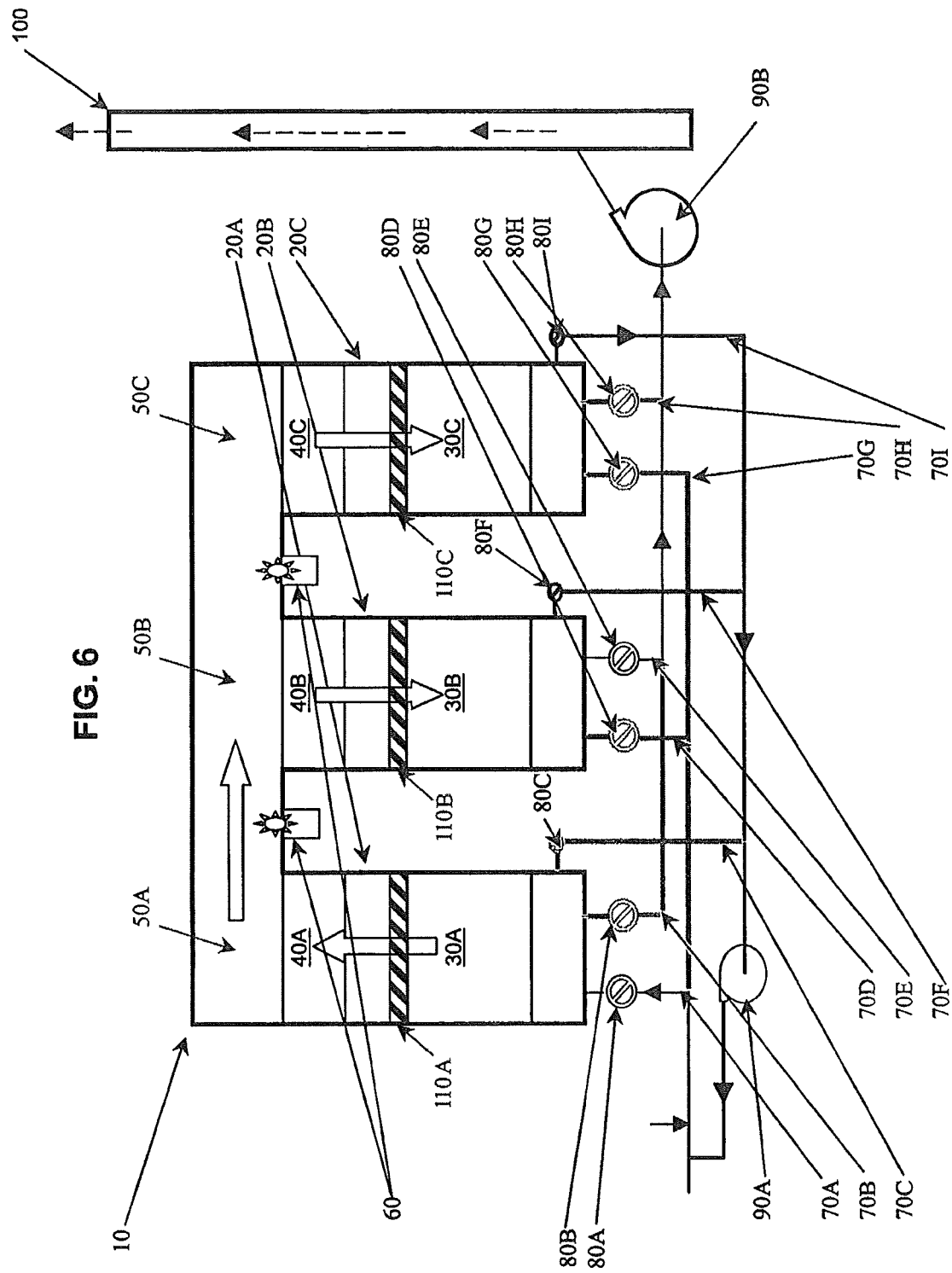
FIG. 6 is a schematic view of another exemplary embodiment of an RSCR apparatus in accordance with the present invention, showing catalyst beds for reduction of carbon monoxide in the space between the catalyst area and heat transfer area of the catalyst chambers.

CO catalyst 110 is shown installed above the SCR catalyst 40 in the example shown in FIG. 4. Air headers can be included below the CO catalyst 110 to allow periodic cleaning of CO catalyst 110. FIG. 5 shows another example where CO catalysts are located in the headspace 50 between neighboring catalyst chambers 20, with the burners 60 positioned in the top of headspace 50. FIG. 6 shows yet another example in which CO catalysts 110A,B,C are arranged inside catalyst chambers 20 within the space between catalyst area 40 and heat transfer area 30. While not show in FIG. 6 for the sake of clarity, ammonia injectors can also be included in between catalyst area 40 and CO catalyst 110 to provide ammonia for $NO_x$ reduction. While described above in the context of specific exemplary configurations, those skilled in the are will readily appreciate that CO catalysts can be situated in any suitable configuration or location within an RSCR system without departing from the spirit and scope of the invention.

The RSCR process of the present invention enjoys several important advantages as compared to conventional selective catalytic reduction (SCR) processes. For example, per-cycle $NO_x$ reductions of up to 90% have been observed in accordance with the present invention. This represents a marked improvement over the 75% reduction rate that is generally regarded as the highest reduction rate for conventional SCR processes.

Another advantage enjoyed by the present invention over conventional SCR processes stems from the fact that the each cycle of the RSCR process of the present invention entails the $NO_x$-containing gas flowing in a first direction in one chamber 20 of the RSCR apparatus, then in a substantially opposite direction in a different chamber. As such, the RSCR process of the present invention allows for levels of heat transfer and heat recovery that are unheard of for convention SCR processes, which call for unidirectional gas flow, and which, therefore, must rely upon additional equipment (such as tubular plates, heat exchangers or other indirect heating equipment) to effect suitable levels of heat transfer. Such extra equipment adds a great deal of expense to the process due to the space it occupies and the energy usage it requires.

Moreover, the design of the RSCR apparatus 10 has not led to problems that would have been expected by one of ordinary skill in the art. For example, when ammonia is used as the reactant that is added to the $NO_x$-containing gas, excessively high levels of ammonia slip have not been observed despite the ability to remove high concentrations of $NO_x$. This is true even though the $NO_x$-containing gas mixed with ammonia moves in different directions through multiple catalyst areas in accordance with the RSCR process of the present invention.

It is a highly unexpected and important benefit of the present invention to be able to ensure high levels of $NO_x$ reduction while not encountering excessively high ammonia slip levels. Without wishing to be bound by theory, the inventor of the present invention believes that at least part of the reason why there are no excessively high levels of ammonia slip in accordance with the RSCR process of the present invention is because the ammonia is added upstream of the catalyst—that is, the reactant (e.g., ammonia) is added to the $NO_x$-containing gas prior to the gas entering the RSCR apparatus 10.

Figure 7:
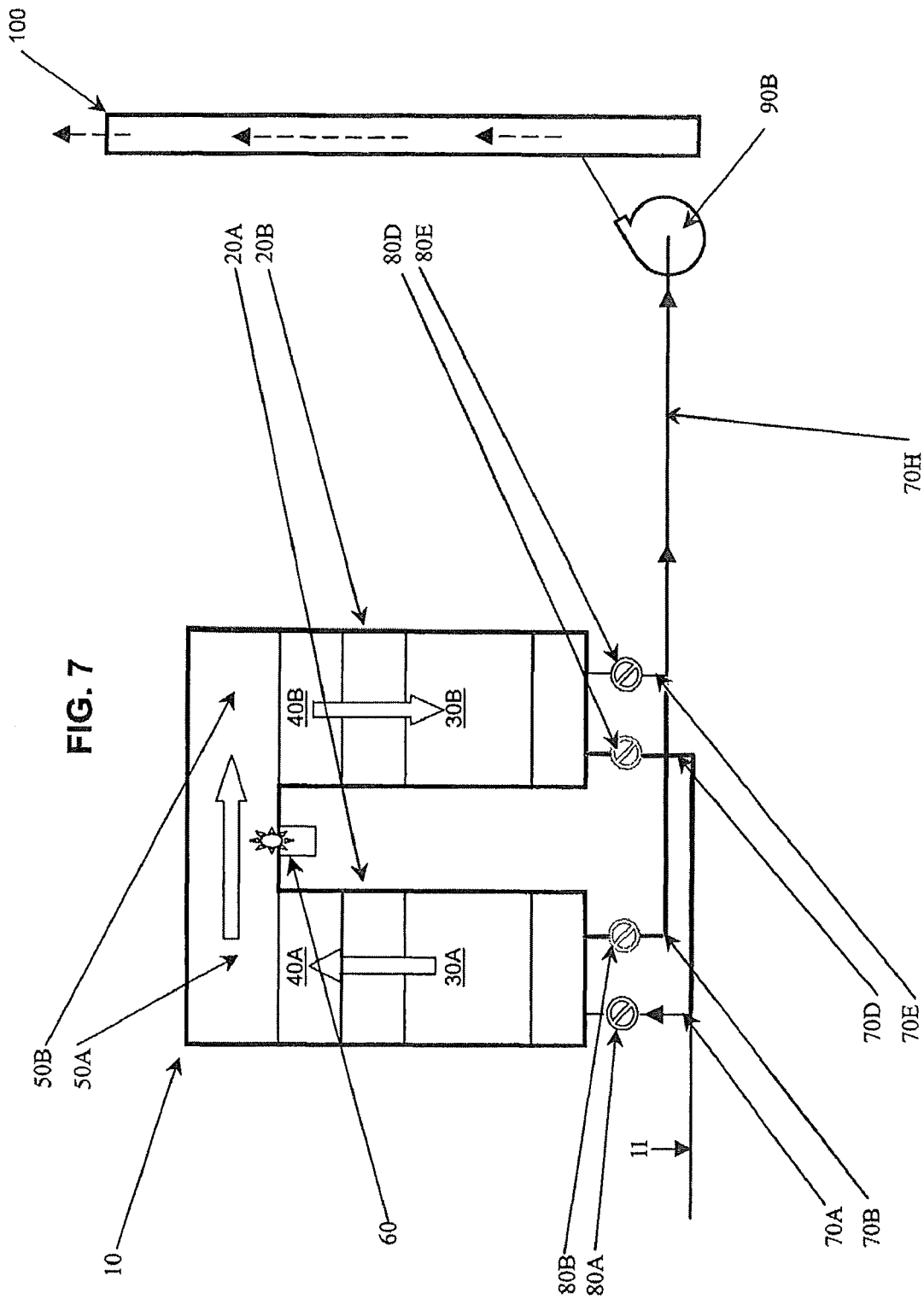
FIG. 7 is a schematic view of another exemplary embodiment of an RSCR apparatus in accordance with the present invention, showing a first cycle for a system with only two chambers.
Figure 8:
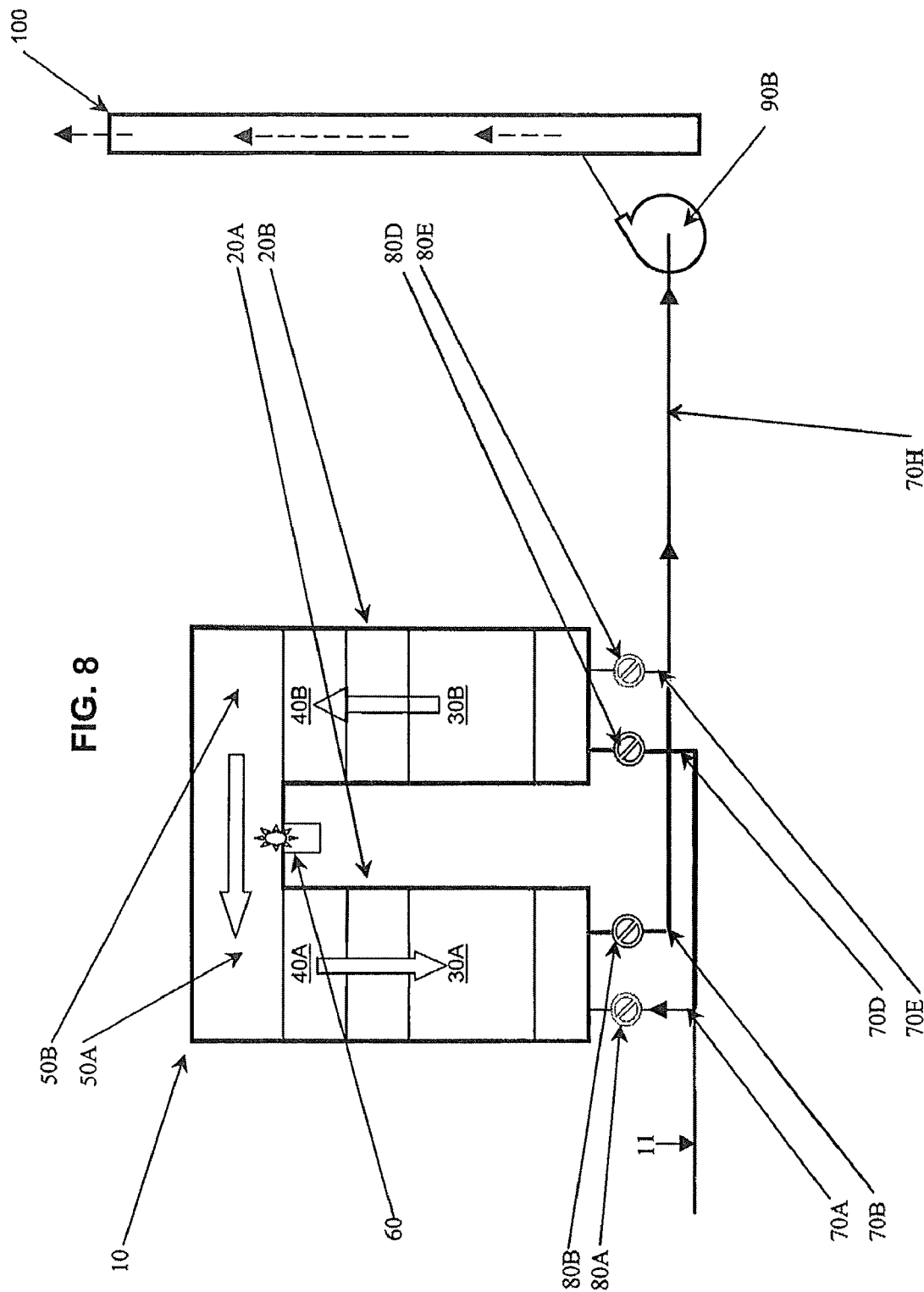
FIG. 8 is a schematic view of the RSCR apparatus of FIG. 7, showing a second cycle.

FIGS. 7-8 show another embodiment of a regenerative selective catalytic process in which only two chambers 20A/B are used. This process includes causing a predetermined concentration of at least one reactant (e.g., ammonia or urea injected at port 11) to be mixed with a predetermined quantity of a contaminant-containing gas (e.g., exhaust gas containing $NO_x$) to form a mixed gas and introducing the mixed gas into a treatment apparatus 10. The mixed gas is treated within the treatment apparatus 10 to reduce the concentration of contaminant in the mixed gas, wherein the treatment apparatus includes first and second heat transfer areas 30A and 30B and first and second catalyst areas 40A and 40B.

In a first cycle, as depicted in FIG. 7, the treatment entails: (i) causing the mixed gas to accept heat from at the first heat transfer area 30A and to provide heat to the second heat transfer area 30B, (ii) causing the mixed gas to encounter the first catalyst area 40A and the second catalyst area 40B, wherein the mixed gas undergoes catalytic reduction at each of the catalyst areas. Thus during the first cycle, gas flows generally past port 11 into chamber 20A, through into chamber 20B, and out to stack 100. Valves 80A and 80E are open and Valves 80B and 80D are closed to allow flow through conduit 70A into chamber 20A and out of chamber 20B through conduit 70E and 70H to stack 100. Heat can be added at burner 60, as described above.

During the second cycle, as indicated in FIG. 8, the flow through the chambers 20A and 20B is reversed and the treatment entails: (i) causing the mixed gas to accept heat from at the second heat transfer area 30B and to provide heat to the first heat transfer area 30A, (ii) causing the mixed gas to encounter the second catalyst area 40B and the second catalyst area 40A, wherein the mixed gas undergoes catalytic reduction at each of the catalyst areas. Thus during the second cycle, gas flows generally past port 11 into chamber 20B, through into chamber 20A, and out to stack 100. Thus, the mixed gas flows in a first direction through the chambers 20A and 20B during the first cycle and a second direction within the through chambers 20A and 20B during the second cycle of such treatment. Valves 80A and 80E are closed and valves 80B and 80D are opened to route flow through conduit 70D into chamber 20B and out chamber 20A through conduit 70B and 70H to stack 100. The mixed gas is caused to be expelled from the apparatus 10 by activating a gas movement influencing device 90B, as indicated in FIGS. 7 and 8.

The process shown in FIGS. 7-8 eliminates one of the chambers/canisters 20 shown in FIGS. 1-6, giving an even number of chambers. RSCR with an even number of canisters is able to achieve the required outlet emissions for $NO_x$ and $NH_3$ by two mechanism: over-performing for $NO_x$ reduction and absorption effects for $NH_3$. The potential $NO_x$ "spike" that would have been previously expected while switching gas flow directions is addressed by having the RSCR operate with slightly higher removal efficiency than required so that the average performance meets requirements even though there is a small burst of $NO_x$ each time the canisters are cycled. For example, with a cycle time of 210 seconds and a damper slewing time of four seconds, inlet $NO_x$ of 157 ppm, and desired removal efficiency of 72%, the desired removal efficiency must be 73.4% to achieve a net output of 72% removal. The cycle time can be kept short, for example, 210 seconds, so that the required overcompensation is minor. For $NH_3$, operation of the RSCR and the nature of the SCR catalyst result in absorption of the ammonia onto the surface of the catalyst such that when the canisters are cycled, the anticipated burst of $NH_3$ does not occur or is insignificant. The net result of both of these effects is to eliminate the need of the odd canister, resulting in capital cost savings since an entire canister and associated dampers, controls, and equipment are eliminated. Those skilled in the art will readily appreciate that the process shown in FIGS. 7-8 can also be adapted to provide CO reduction, as described above with respect to FIGS. 4-6.

Although the present invention has been described herein with reference to details of currently preferred embodiments, it is not intended that such details be regarded as limiting the scope of the invention, except as and to the extent that they are included in the following claims—that is, the foregoing description of the present invention is merely illustrative, and it should be understood that variations and modifications can be effected without departing from the scope or spirit of the invention as set forth in the following claims. Moreover, any document(s) mentioned herein are incorporated by reference in their entirety, as are any other documents that are referenced within the document(s) mentioned herein.

What is claimed is:

1. A regenerative selective catalytic process, comprising the steps of:
   (a) causing a predetermined concentration of at least one reactant to be mixed with a predetermined quantity of a contaminant-containing gas to form a mixed gas;
   (b) introducing the mixed gas into a treatment apparatus;
   (c) treating the mixed gas within the treatment apparatus to reduce the concentration of contaminant in the mixed gas, wherein the treatment apparatus includes a plurality of heat transfer areas and a plurality of catalyst areas, and wherein such treatment entails:
      (i) causing the mixed gas to accept heat from at least a first of the plurality of heat transfer areas and to provide heat to at least a second of the plurality of heat transfer areas,
      (ii) causing the mixed gas to encounter at least a first of the plurality of catalyst areas and a second of the plurality of catalyst areas, and wherein the mixed gas undergoes catalytic reduction at each of the at least first of the plurality of catalyst areas and the second of the plurality of catalyst areas,
      (iii) causing the mixed gas to encounter means for oxidizing CO in the mixed gas, and
      (iv) causing the mixed gas to flow in at least a first direction and a second direction within the apparatus during such treatment, the first direction being different than the second direction;
   (d) causing the mixed gas to be expelled from the apparatus by activating a first gas movement influencing device that is in communication with at least one of the plurality of heat transfer areas of the apparatus; and
   (e) purging reactant from the apparatus during treatment step (c).

2. The process of claim 1, wherein the mixed gas flows in the first direction from the first of the plurality of heat transfer areas to the first of the plurality of catalyst areas and in the second direction from the second of the plurality of heat transfer areas to the second of the plurality of catalyst areas.

3. The process of claim 1, wherein the apparatus includes a plurality of chambers, and wherein both the first of the plurality of heat transfer areas and the first of the plurality of catalyst areas are located in a first of the plurality of chambers, and wherein both the second of the plurality of heat transfer areas and the second of the plurality of catalyst areas are located in a second of the plurality of chambers.

4. The process of claim 1, wherein the first of the plurality of heat transfer areas provides heat to the mixed gas and the second of the plurality of heat transfer areas accepts heat from the mixed gas.

5. The process of claim 1, further comprising the step of: prior to step (b), pre-heating the first of the plurality of heat transfer areas to a predetermined temperature.

6. The process of claim 5, wherein the predetermined temperature is in the range of about 600° F. to about 800° F.

7. The process of claim 1, wherein the first gas movement influencing device is a fan.

8. The process of claim 1, wherein the first gas movement influencing device is in communication with the at least one chamber via a conduit.

9. The process of claim 8, wherein the conduit includes a damper, and wherein the damper is open when the gas movement influencing device is activated.

10. The process of claim 1, wherein the treatment apparatus includes at least one heat producing device.

11. The process of claim 10, wherein the at least one heat producing device has a predetermined location whereby it can provide heat to the mixed gas prior to the mixed gas encountering one of the plurality of catalyst areas.

12. The process of claim 10, wherein the at least one heat producing device is a burner.

13. The process of claim 10, wherein the temperature of the at least one heat producing device is in the range of about 900° F. to about 1600° F. upon being encountered by the mixed gas.

14. The process of claim 1, wherein the at least one reactant is ammonia.

15. The process of claim 1, wherein the temperature of the mixed gas is in the range of about 200° F. to about 400° F. following step (a).

16. The process of claim 15, wherein the temperature of the mixed gas is in the range of about 300° F. to about 350° F. following step (a).

17. The process of claim 16, wherein the temperature of the mixed gas is about 325° F. following step (a).

18. The process of claim 1, wherein the contaminant-containing gas contains nitrogen oxide $NO_x$.

19. The process of claim 1, wherein the step of purging reactant from the apparatus includes purging reactant from the apparatus by activating a second gas movement influencing device that is in communication with at least a third of the plurality of heat transfer areas of the apparatus not being used in said treatment step (c).

20. A regenerative selective catalytic process, comprising the steps of:
   (a) causing a predetermined concentration of at least one reactant to be mixed with a predetermined quantity of a contaminant-containing gas to form a mixed gas;
   (b) introducing the mixed gas into a treatment apparatus;
   (c) treating the mixed gas within the treatment apparatus to reduce the concentration of contaminant in the mixed gas, wherein the treatment apparatus includes first and second heat transfer areas, first and second reduction catalyst areas, and an oxidation catalyst area, and wherein such treatment entails:
- (i) causing the mixed gas to accept heat from the first heat transfer area and to provide heat to the second heat transfer area,
- (ii) causing the mixed gas to encounter the first reduction catalyst area, the oxidation catalyst area, and the second reduction catalyst area, wherein the mixed gas undergoes catalytic reduction at each of the reduction catalyst areas, and undergoes oxidation at the oxidation catalyst area, and
- (iv) causing the mixed gas to flow in at least a first direction and a second direction within the apparatus during such treatment, the first direction being different from the second direction; and (d) causing the mixed gas to be expelled from the apparatus by activating a gas movement influencing device that is in communication with at least one of the heat transfer areas of the apparatus.

21. A regenerative selective catalytic process, comprising the steps of:
- (a) causing a predetermined concentration of at least one reactant to be mixed with a predetermined quantity of a contaminant-containing gas to form a mixed gas;
- (b) introducing the mixed gas into a treatment apparatus;
- (c) treating the mixed gas within the treatment apparatus to reduce the concentration of contaminant in the mixed gas, wherein the treatment apparatus includes first and second heat transfer areas, first and second reduction catalyst areas, and an oxidation catalyst area, and wherein such treatment entails:
  - (i) causing the mixed gas to accept heat from the first heat transfer area and to provide heat to the second heat transfer area,
  - (ii) causing the mixed gas to encounter the first reduction catalyst area, wherein the mixed gas undergoes catalytic reduction;
  - (iii) causing the mixed gas to encounter the oxidation catalyst area, wherein the mixed gas undergoes oxidation at the oxidation catalyst area downstream of the first reduction catalyst area;
  - (iv) causing the mixed gas to encounter the second reduction catalyst area, wherein the mixed gas undergoes further catalytic reduction downstream of the oxidation catalyst area, and
  - (v) causing the mixed gas to flow in at least a first direction and a second direction within the apparatus during such treatment, the first direction being different from the second direction; and
- (d) causing the mixed gas to be expelled from the apparatus by activating a gas movement influencing device that is in communication with at least one of the heat transfer areas of the apparatus.

* * * * *